(12) United States Patent
Ibbotson et al.

(10) Patent No.: US 12,491,466 B2
(45) Date of Patent: Dec. 9, 2025

(54) SYSTEMS AND METHODS FOR REMOVING ORGANIC COMPOUNDS FROM THE OUTPUT OF PYROLYSIS OR OTHER REACTORS

(71) Applicant: Modern Hydrogen, Inc., Woodinville, WA (US)

(72) Inventors: Matthew Gianni Equi Ibbotson, Seattle, WA (US); Andrew Thomas Koch, Seattle, WA (US); John Joel Lorr, Monroe, WA (US); Max Nathan Mankin, Shoreline, WA (US); William Hunter Harrison Nealley, Seattle, WA (US); Kathryn Elizabeth Roach, Seattle, WA (US); Vikram Seshadri, Bothell, WA (US); Sergey Vasilyevich Tsurkan, Bothell, WA (US); Kevin J. Hughes, Seattle, WA (US)

(73) Assignee: Modern Hydrogen, Inc., Woodinville, WA (US)

( * ) Notice: Subject to any disclaimer, the term of this patent is extended or adjusted under 35 U.S.C. 154(b) by 0 days.

(21) Appl. No.: 18/925,407

(22) Filed: Oct. 24, 2024

(65) Prior Publication Data

US 2025/0128199 A1 Apr. 24, 2025

Related U.S. Application Data

(60) Provisional application No. 63/592,906, filed on Oct. 24, 2023.

(51) Int. Cl.
*B01D 53/02* (2006.01)
*B01D 46/00* (2022.01)
(Continued)

(52) U.S. Cl.
CPC ....... *B01D 53/0454* (2013.01); *B01D 46/003* (2013.01); *B01D 46/0032* (2013.01);
(Continued)

(58) Field of Classification Search
CPC .............. B01D 53/0454; B01D 53/002; B01D 53/0446; B01D 46/003; B01D 46/4272;
(Continued)

(56) References Cited

U.S. PATENT DOCUMENTS 3,451,895 A * 6/1969 Webb ........................ G01N 1/10
203/1
4,480,393 A * 11/1984 Flink ...................... B01D 3/007
95/122

(Continued)

*Primary Examiner* — Christopher P Jones
(74) *Attorney, Agent, or Firm* — Fredrikson & Byron, P.A.

(57) ABSTRACT

Systems and methods for removing organic compounds byproducts from a product stream from a pyrolysis reactor and associated systems and methods are disclosed herein. In some embodiments, the system includes a first condenser that is fluidly couplable to the product stream, a coalescer that is fluidly couplable to the product stream downstream from the first condenser along a first flow path, and a second condenser that is fluidly couplable to the product stream downstream from the first condenser along a second flow path. The system also includes a first valve positioned to regulate the flow of the product stream along the first flow path including a second valve positioned to regulate the flow of the product stream along the second flow path.

20 Claims, 13 Drawing Sheets

(51) Int. Cl.
*B01D 46/42* (2006.01)
*B01D 53/00* (2006.01)
*B01D 53/04* (2006.01)

(52) U.S. Cl.
CPC ....... *B01D 46/4272* (2013.01); *B01D 53/002* (2013.01); *B01D 53/0446* (2013.01); *B01D 2253/102* (2013.01); *B01D 2257/708* (2013.01); *B01D 2259/40003* (2013.01)

(58) Field of Classification Search
CPC ........ B01D 2253/102; B01D 2257/708; B01D 2259/40003
See application file for complete search history.

(56) References Cited

U.S. PATENT DOCUMENTS

| | | | | |
|---|---|---|---|---|
| 4,508,698 A | * | 4/1985 | Reed | C01B 17/0439 423/576 |
| 4,608,120 A | * | 8/1986 | Greenfield | C02F 11/002 202/185.1 |
| 9,212,058 B2 | | 12/2015 | De Graffenried, Sr. | |
| 10,787,362 B2 | | 9/2020 | De Graffenried, Sr. | |
| 2008/0050306 A1 | * | 2/2008 | Keller | C01B 17/0469 422/651 |
| 2014/0017162 A1 | * | 1/2014 | Kamisuki | B01J 8/0419 423/576.2 |
| 2021/0086131 A1 | * | 3/2021 | Northrop | B01D 53/1431 |
| 2022/0315424 A1 | | 10/2022 | Radaelli et al. | |
| 2022/0387952 A1 | | 12/2022 | Mahdi et al. | |
| 2024/0217815 A1 | | 7/2024 | Radaelli et al. | |
| 2024/0343703 A1 | * | 10/2024 | Distante | B01J 23/14 |
| 2024/0391771 A1 | * | 11/2024 | Alotaibi | C01B 17/0421 |
| 2025/0128941 A1 | | 4/2025 | Mankin et al. | |
| 2025/0128942 A1 | | 4/2025 | Mankin et al. | |
| 2025/0129936 A1 | | 4/2025 | Kumar et al. | |
| 2025/0189120 A1 | | 6/2025 | Kraemer et al. | |

\* cited by examiner

SYSTEMS AND METHODS FOR REMOVING ORGANIC COMPOUNDS FROM THE OUTPUT OF PYROLYSIS OR OTHER REACTORS

CROSS-REFERENCE TO RELATED APPLICATIONS

This application claims priority to U.S. Provisional Patent Application No. 63/592,906, filed Oct. 24, 2023, the entirety of which is incorporated herein by reference.

TECHNICAL FIELD

The present technology is generally related to systems and methods for removing byproducts from the output of a pyrolysis or other reactor. In particular, the present technology relates to systems and methods for removing organic compounds as a function of byproduct boiling point, melting point, and/or molecular weight from the output of the pyrolysis or other reactor.

BACKGROUND

Pyrolysis reactors produce hydrogen with little or no carbon dioxide emissions. In general, pyrolysis reactors function by heating a hydrocarbon input in an oxygen-free environment to a temperature at which a reaction takes place where hydrogen and carbon are generated from the hydrocarbon, while continuing to add heat to supply the required enthalpy of the pyrolysis reaction. The output of hydrocarbon pyrolysis includes solid carbon and hydrogen gas. The solid carbon can then be filtered from the output in a carbon collection system, thereby preventing the carbon from being emitted as carbon dioxide. As a result, pyrolysis reactors can transform the hydrocarbon input, such as methane, into combustible hydrogen while separating the carbon from the fuel. Furthermore, hydrogen gas can be used by many systems designed to use methane, natural gas, or other hydrocarbons. Thus, pyrolysis reactors create an opportunity to significantly reduce carbon dioxide, carbon oxide, and other greenhouse gas emissions by scrubbing the carbon from methane, natural gas, or other hydrocarbons. Accordingly, hydrocarbons (e.g., natural gas) can be de-carbonized before they are combusted or reacted (e.g., to heat a home, in a furnace, in a boiler, in an engine, and the like). However, the current technology requires additional solutions for filtering the output of the pyrolysis reactor to capture byproducts of the reaction such as organic partial reaction products, also referred to herein as "byproduct compounds" or "compounds," to help improve the purity of product streams from pyrolysis reactors.

Figure 1:
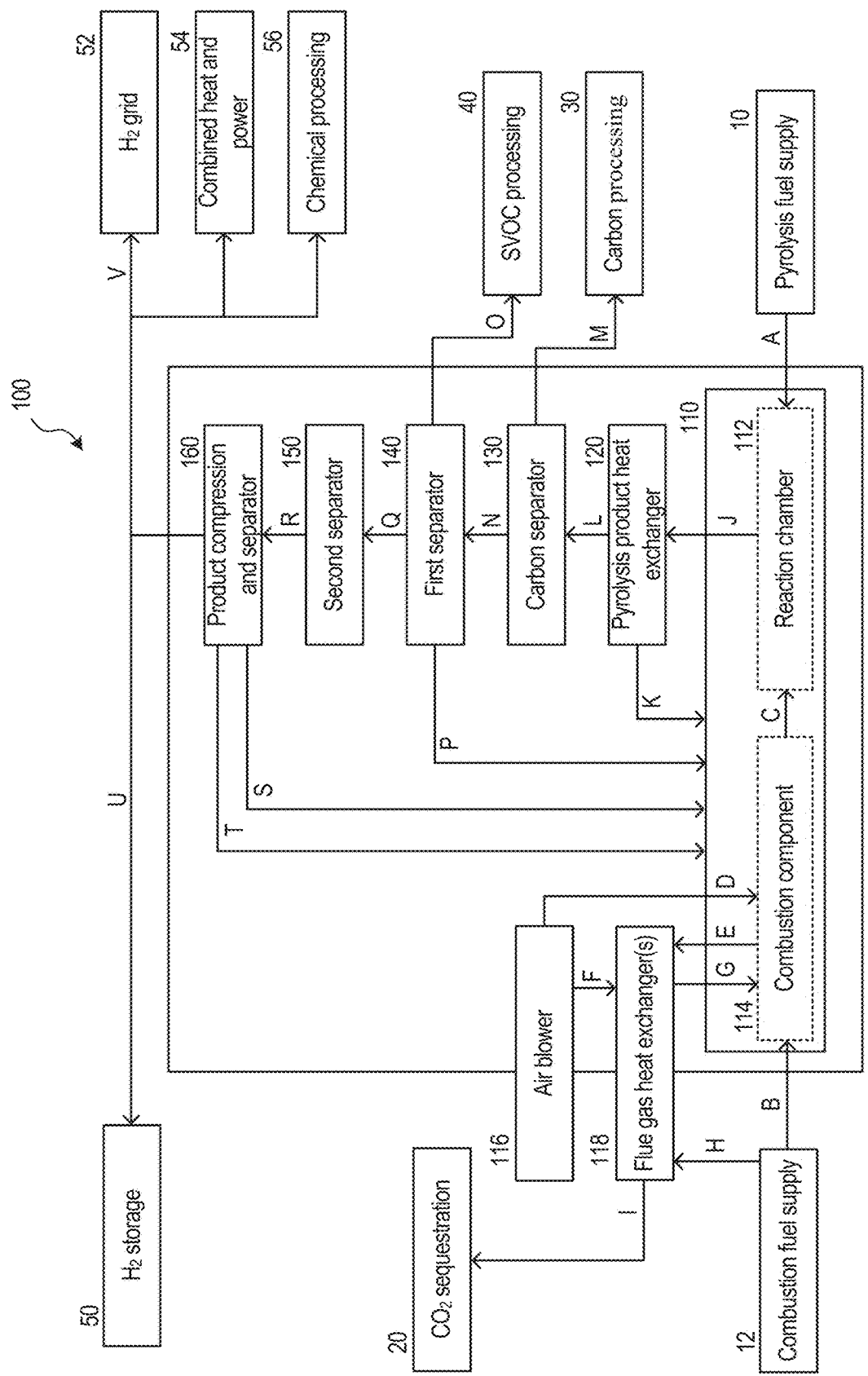
FIG. 1 is a schematic block diagram of a pyrolysis system configured in accordance with embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Pyrolysis reactors heat hydrocarbon reactants (e.g., methane, natural gas, ethane, propane, butane, pentane, gasoline, diesel, kerosene, and/or the like) to decompose them into hydrogen gas, solid carbon, and various products. For example, pyrolysis reactors can decompose the methane, ethane, propane and other hydrocarbon components in natural gas to generate hydrogen gas. In the example of methane, the pyrolysis reaction is:

$CH_4(gas) \rightarrow C(solid) + 2\ H_2(gas).$

The hydrogen gas can then be substituted as the combustion fuel anywhere the natural gas, or other hydrocarbons would have been used. For example, the hydrogen gas can be consumed by various heating units (e.g., furnaces, water heaters, water boilers, steam boilers, and/or the like), combustion engines, fuel cells and/or power generators (e.g., in a backup power generator), combined heat and power systems, cooking units (e.g., gas stoves), and/or in various other suitable uses. Additionally, or alternatively, the hydrogen can be used in various industrial processes, such as producing various ammonia-based products (e.g., ammonia fertilizers), providing process heat, and/or other chemical processing industries and/or injected back into the natural gas pipeline to partially decarbonize the natural gas in the pipeline.

The pyrolysis reaction can form partial reaction byproducts such as aromatic hydrocarbon byproducts, as well as various other organic compound byproducts (e.g., pyrolysis oil; asphaltenes; acetylene; carbon monoxide; carbon dioxide; water vapor; organic compounds such as volatile organic compounds (VOCs) (e.g., hexane, propane, butane, butadiene, toluene, benzene, trimethylbenzene, ethanol, formaldehyde, naphthalene) and/or semi-volatile organic compounds (SVOCs) (e.g., decane, fluorene, bibenzofuran, chrysene, pyrene, fluroanthene, octadecane, penanthrene, anthracene, naphthalene, caprolactum, and/or the like); other oils; waxes; and/or the like). If left in the product stream from the pyrolysis reactor, the byproducts can threaten to damage and/or clog processing equipment, and/or serve as unwanted impurities in a downstream process. Conversely, when removed from the product stream, the byproducts can be utilized in other processes. Purely by way of example, the byproducts can be later combined with the solid carbon coproduct of the pyrolysis reaction to prepare the carbon coproduct for downstream uses (e.g., to partially replace bitumen as a binder for asphalt products). Accordingly, it is desirable to remove the byproducts from the product stream and/or utilize them in further processes.

In other settings, unwanted byproducts, such as organic compounds, are typically destroyed by oxidation methods and/or absorbed into coalescing filters and/or absorption beds (e.g., activated carbon beds and/or the like). However, the oxidation methods are difficult to implement in a pyrolysis system because the oxidation methods typically also destroy hydrogen gas and/or unreacted hydrocarbons. Additionally, oxidation methods can convert some of the byproducts (e.g., the organic compounds) to carbon dioxide, which is counter-productive for reducing carbon dioxide emissions from the reactor. As a result, the oxidation methods would destroy the usable components in the product stream. Coalescing filters are also difficult to implement by themselves in a pyrolysis system because they don't have a high enough absorption capacity, cannot handle solid particles in the product stream (e.g. solid carbon particulates), and/or are not compatible with the operating temperatures of the product stream. For example, activated carbon beds typically cannot be used at temperatures above 50 degrees Celsius (° C.). In one specific non-limiting example, the temperature of the product stream is above 200° C. and the condensation point of the byproducts can be between about 40° C. and about 200° C. In another specific non-limiting example, the temperature of the product stream is above 350° C. and the condensation point of the byproducts can be between about 40° C. and about 350° C. In another specific non-limiting example, the temperature of the product stream is above 500° C. and the condensation point of the byproducts can be between about 40° C. and about 500° C. Accordingly, new solutions for removing byproducts from the product stream would be needed to enable pyrolysis reactors to be widely implemented in this example.

Systems and methods for removing byproducts (e.g., partial reaction products such as organic compounds) from a product stream from a pyrolysis (or other) reactor, and associated systems and methods are disclosed herein. The byproduct removal system (sometimes also referred to herein as a "byproduct separation system," a "byproduct-scrubbing system" an "organic compound separator," an "organic compound separation system," and/or the like) can include a first flow path and a second flow path. The first flow path can include a first condenser that is fluidly couplable to the product stream and a coalescer that is fluidly couplable to the product stream downstream from the first condenser along the first flow path. The second flow path can include a second condenser that is fluidly couplable to the product stream. In some embodiments, the second condenser is-fluidly couplable to the product stream downstream from the first condenser along the second flow path (e.g., such that the first and second condensers are in series and/or in line along the second flow path). In various such embodiments, the coalescer can also be downstream from the second condenser along the second flow path (e.g., downstream from a tee coupled to the first and second flow paths), the second flow path can include a second coalescer downstream from the second condenser, and/or the like. In some embodiments, the second flow path is generally (or fully) parallel to the first flow path. For example, system can include an initial tee that has an input fluidly couplable to the product stream, and the first and second flow paths can be coupled to different outputs of the initial tee. In any of the embodiments discussed above, the system also includes one or more flow control components to control the flow of the product stream along the first and second flow paths.

In a specific example, the flow control component can include a set of one or more valves that are configurable between a first state that at least partially blocks (e.g., inhibits) the product stream from flowing along the second flow path (and/or allows the product stream to flow along the first flow path) and a second state that allows the product stream to flow along the second flow path (and/or inhibits the product stream from flowing along the first flow path). While the set of one or more valves (or another suitable flow control component) is in the first configuration, the first condenser can cool the product stream (or otherwise absorb heat from the product stream to passively cool the product stream), thereby causing gaseous organic compounds or other byproducts to condense into liquid and/or freeze into a solid within the first condenser. The liquid and/or solid byproducts are trapped and/or drained out of the first condenser toward a reservoir (or other outlet) while the product stream continues along the first flow path toward the coalescer. The coalescer absorbs (and/or otherwise captures) at least a portion of any remaining byproducts remaining in the product stream. The coalescer then drains the captured byproducts toward the reservoir (or other outlet) while the scrubbed product stream flows out of the separating system. Such a system can be configured with temperatures, flow rates, and residence times such that compounds with lower melting points and higher boiling points, or heavier molecular weights, collect in the first condenser as desired. The material collected in the reservoir can be recycled back to the reactor to improve efficiency and/or used for other applications. In some embodiments, the reservoir is eliminated in favor of an outlet to a continuous recirculation channel to direct the separated byproducts to the reactor (or any other suitable endpoint). In some embodiments, the byproducts are distilled to individual constituents that can used in other end-use applications.

Over time, byproducts can build up in the first condenser and/or the coalescer. For example, the byproduct can cool to solids in the first condenser that impede the product stream and/or the fluid byproducts may not drain fast enough to avoid interfering with the product stream. When a build-up occurs, the set of one or more valves (or another suitable flow control component) can be transitioned into the second state to implement a regeneration process on the first condenser and/or the first coalescer. During regeneration, the first condenser and/or the first coalescer are heated (or not actively cooled) such that solids melt and drain out the first condenser and/or the first coalescer, fluids drain more quickly, and/or some byproduct compounds evaporate and are carried out by the product stream along the second flow path. Further, while regenerating the first flow path, the second condenser can cool the product stream (or absorb heat from the product stream to passively cool the product stream) to condense at least a portion of the byproducts compound in the product stream. As a result, the second condenser can separate byproducts from the product stream while the first condenser and/or the first coalescer are being regenerated. Once the regeneration process is complete (e.g., after a suitable period and/or after a sufficient amount of the build-up has been removed), the set of one or more valves (or another suitable flow control component) is returned to the first state to resume normal operation.

In some embodiments, the byproduct separating system further includes a second coalescer that is fluidly couplable to the product stream downstream from the second condenser along the second flow path. In some such embodiments, the set of one or more valves can include a first valve positioned downstream from the first coalescer along the first flow path and a second valve positioned downstream from the second coalescer along the second flow path. In the first state discussed above, the first valve is open and the second valve is closed. As a result, the set of valves blocks (e.g., inhibits) the product stream from flowing out of the second coalescer along the second flow path while allowing the product stream to flow out of the first coalescer along the first flow path. Conversely, in the second state, the first valve is closed and the second valve is open to block the product stream from flowing out of the first coalescer along the first flow path while allowing the product stream to flow out of the second coalescer along the second flow path.

In some embodiments, the set of one or more valves can include a first valve positioned upstream from the first condenser and a second valve positioned upstream from the second condenser. In the first state, the first valve is open and the second valve is closed to at least partially block the product stream from entering the second flow path. In the second state, the first valve is closed and the second valve is open to at least partially block the product stream from entering the first flow path.

In some embodiments, the set of one or more valves includes a three-way valve positioned upstream from the first and second condensers. In such embodiments, the three-way valve can be transitioned between a first state directing the product stream along the first flow path (and blocking the second flow path) and a second state the product stream along the second flow path (and blocking the first flow path).

In various embodiments, the flow control component includes various other mechanisms to help control a flow of the product stream along the first and second flow paths. For example, the flow control component can include an actuator that alters the connection of the first and second flow paths to the product stream (e.g., by rotating the connection) and/or an outlet for the product stream. In another example, the flow control component can include one or more controllable flow paths that can change between a first state allowing the product stream to flow along a flow path and a second state obstructing the flow. In yet another example, the flow control component can rotate two or more condensers about an axis. As they rotate, the two or more condensers can move between a first position coupled to the product stream and a second position coupled to an outlet (e.g., to the reservoir) to regenerate. As a result, the rotation of the two or more condensers can control a flow of the product stream along the first and second flow paths.

In some embodiments, the byproduct separator includes a cylindrical condenser that is constantly regenerated. For example, an actuation component can rotate the cylindrical condenser about a central axis to cycle portions of the cylindrical condenser between a cylindrical cooling zone and a heating zone. The portions of the cylindrical condenser in the cooling zone can be coupled to the product stream to remove byproducts (e.g., organic compounds and/or other byproducts) from the product flow. The portions of the cylindrical condenser in the heating zone can be coupled to an outlet (e.g., the reservoir) to remove byproducts from the cylindrical condenser and regenerate the cylindrical condenser. In such embodiments, the cylindrical condenser can be constantly regenerated, thereby reducing (or removing) the need for a regeneration of the cylindrical condenser that stops all condensation therein. In some embodiments, the cylindrical condenser is divided into multiple zones that are in parallel along the product stream. In a specific, non-limiting example, the cylindrical condenser includes two zones that are separated by a perforated plate and/or another suitable divider. The first zone can contain metal beads (or another suitable packing material) and the second zone can contain zeolites (or another suitable adsorption agent that can remove organic compounds from the product gas). During operation, the product stream flows first through the metal beads then through the adsorption material, thereby removing both compounds of lighter (e.g., less than 100 atomic mass unit (AMU)) and heavier (e.g., between about 100 AMU and about 1000 AMU) molecular weights in series. When the cylindrical chamber passes through a heating region, the byproducts can then be removed and/or directed to an outlet (e.g., the reservoir). When the chamber moves through the cooling region, both the metal beads and the adsorption material are cooled to an appropriate temperature to remove byproducts.

In some embodiments, the byproduct separating system includes only a single coalescer that is further fluidly couplable to the product stream downstream from the second condenser along the second flow path. In such embodiments, the set of one or more valves can include a first valve positioned between the first condenser and the coalescer and a second valve between the second condenser and the coalescer. In the first state, the first valve is open and the second valve is closed to prevent the product stream from passing through the second condenser path before reaching the coalescer. Conversely, in the second state, the first valve is closed and the second valve is open to prevent the product stream from passing through the coalescer without moving through the second condenser.

For case of reference, the byproduct separating system and its components are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the byproduct separating system can be moved to, and used in, different spatial orientations without changing the structure and/or function of the disclosed embodiments of the present technology.

Further, although primarily discussed herein as a byproduct separating system for removing organic compounds from the product stream of a pyrolysis reaction system, one of skill in the art will understand that the scope of the technology is not so limited. For example, the byproduct separating system can also be implemented in any other environment that generates similar byproducts in terms of molecular weight, boiling/melting points, adsorption properties, and the like. Accordingly, the scope of the invention is not confined to any subset of embodiments and is confined only by the limitations set out in the appended claims.

Additionally, although the pyrolysis reactions discussed herein are primarily related to methane (or natural gas) pyrolysis, one of skill in the art will understand that the scope of the technology is not so limited. For example, pyrolysis systems of the type disclosed herein can also be used to break down gasoline, ethane, propane, kerosene, diesel, biomass, biogas, organic and semi-organic waste material, and/or the like.

Still further, unless explicitly indicated, "tee" is not limited to traditional 90° tee fittings. Instead, "tee" is used to generally refer to fittings with three (or more) connections, including 90° tees, 45° tees, 60° tees, wyes, three-way connections, and/or any other suitable connections.

Still further, although the systems are discussed primarily herein to remove byproducts from a product stream, one of skill in the art will understand that the compounds (e.g., oils, organic compounds, hydrocarbons, water, and/or the like) can be the targeted product that needs to be separated from other gases. In such embodiments, the pyrolysis reaction system and/or other suitable reactor and/or product stream generator can be adjusted to maximize the production of the targeted product (e.g., to maximize production of organic compounds). Additionally, or alternatively, the separation systems can be adjusted to account for differences in the product stream to collect only the targeted product (e.g., the temperature of the condensers and/or coalescers can be adjusted to target specific organic compounds based on their boiling point and/or melting point).

Description of the Figures

FIG. 1 is a schematic block diagram of a pyrolysis system 100 configured in accordance with embodiments of the present technology. In the illustrated embodiment, the pyrolysis system 100 includes a pyrolysis reactor 110, a pyrolysis product heat exchanger 120, a carbon separator 130, a first separator 140 (e.g., a separator for heavier molecular weight compounds, such as various SVOCs and/or other compounds), a second separator 150 (e.g., a separator for lighter molecular weight compounds, such as various VOCs and/or other compounds), and a product compression and separator component 160.

In the illustrated embodiments, the pyrolysis reactor 110 includes a reaction chamber 112 and a combustion component 114. The reaction chamber 112 is operably couplable to a pyrolysis fuel supply 10 to receive a hydrocarbon reactant (e.g., natural gas, pure methane, gasoline, diesel, biomass, biogas, organic and semi-organic waste material, and/or the like) along a first path (A). The first path (A) can include one or more valves (or another suitable flow control component) and pipes coupling the reaction chamber 112 to a natural gas supply or pipeline. The reaction chamber 112 can use heat received from the combustion component 114 to raise the temperature of the hydrocarbon reactant and supply the required activation energy for hydrocarbon pyrolysis. As a result, the reaction chamber 112 causes a pyrolysis reaction that breaks the hydrocarbon reactant into hydrogen gas and carbon. Returning to the natural gas example above, the reaction chamber 112 can use heat from the combustion component 114 to heat the hydrocarbon reactant to (or above) about 650° C. For example, the reaction chamber 112 can use heat from the combustion component 114 to heat the hydrocarbon reactant to a temperature between about 650° C. and about 5000° C., between about 750° C. and about 3000° C., or between about 850° C. and about 1800° C.

The combustion component 114 can provide the heat for the pyrolysis reaction to occur. In some embodiments, the combustion component 114 includes one or more burners that receive and combust a combustion fuel. As illustrated in FIG. 1, the combustion component 114 is fluidly couplable to a combustion fuel supply 12 to receive a combustion fuel along a second path (B) (e.g., one or more valves and/or fluid pipelines couplable to the fuel supply 12). The combustion fuel can include various hydrocarbons (e.g., natural gas, pure methane, gasoline, diesel, and/or the like) and/or a hydrogen gas from a previous pyrolysis reaction in the reaction chamber 112.

The combustion component 114 is thermally coupled to the reaction chamber 112 to receive heat along a third path (C). In various embodiments, the reaction chamber 112 can be coupled to the combustion component 114 through a heat exchanger, a shared wall between the reaction chamber 112 and the combustion component 114, a flow of flue gas from the combustion component 114 through the reaction chamber 112 and/or in contact with a wall of the reaction chamber 112, and/or any other suitable mechanism. Additional details on examples of suitable pyrolysis reactors, and the thermal coupling between the reaction chamber 112 and the combustion component 114, are set out in U.S. Patent Publication No. 2021/0380407 to Ashton et. al, U.S. Patent Publication No. 2022/0315424 to Ashton et. al, and U.S. Patent Publication No. 2022/0120217 to Ashton et. al, and U.S. Patent Publication No. 2022/0387952 to Groenewald et al., each of which is incorporated herein by reference in their entireties.

Further, it will be understood that while specific examples of the pyrolysis reactor 110 have been discussed herein, the technology is not so limited. For example, in some embodiments, the reaction in the reaction chamber 112 can be driven by: a thermal coupling to another suitable component (e.g., a home heating device, such as a furnace, water boiler, steam boiler, and/or the like) coupled to the hydrocarbon reactant (e.g., in and/or upstream of the reaction chamber 112); a catalytic heater coupled to the hydrocarbon reactant; an electrical heating component coupled to the hydrocarbon reactant; a microwave component operably coupled to the hydrocarbon reactant (e.g., to microwave gas in the reaction chamber 112); and/or any other suitable component. In a specific, non-limiting example, the reaction chamber 112 can include molten salt that is heated by electrical heaters and/or hot gas from another suitable component and/or a fluidized bed reactor with or without a catalyst. In this example, the molten salt can heat the incoming hydrocarbon reactant to cause the pyrolysis reaction. In another specific, non-limiting example, the reaction chamber 112 and the combustion component 114 can be integrated (e.g., in a continuous (or generally continuous) combustion pyrolysis (CCP) reactor of the type discussed in U.S. Patent Publication No. 2022/0387952, incorporated by reference above).

Still further, as discussed above, it will be understood that, in some embodiments, aspects of the technology disclosed herein can be applied to other settings that generate byproducts (e.g., other reactors, chemical processing facilities, manufacturing facilities (e.g., for manufacturing pesticides, cleaning agents, personal care products, solvents, and/or the like), and/or the like). In a specific, non-limiting example, a first separator 140 of the type discussed in more detail below can be included in a chemical processing facility to process a product stream that includes one or more similar byproducts.

As further illustrated in FIG. 1, the pyrolysis system 100 also includes an air blower 116 (or compressor) and flue gas heat exchanger(s) 118 that are coupled to, or integrated with, the pyrolysis reactor 110. For example, the air blower 116 can be coupled to the combustion component 114 along a fourth flow path (D) to supply air and/or pure oxygen to the combustion component 114. As a result, the air blower 116 can help facilitate and/or control the combustion of the combustion fuel. For example, the adjusting a speed of the air blower 116 can help control an oxygen-to-fuel ratio in the combustion component 114 that, in turn, controls a temperature and/or energy content of the combustion therein. In some embodiments, the air blower 116 is integrated directly with the combustion component 114 (e.g., as part of a fuel-mixing component upstream from the burners). In other embodiments, the air blower 116 is a separate component that is operably coupled to the combustion component 114. In such embodiments, the air blower 116 can be integrated with the pyrolysis reactor 110 or be separated from the pyrolysis reactor 110 and operably coupled thereto.

After transferring heat to the reaction chamber 112, the combustion component 114 (or another suitable component of the pyrolysis reactor 110) can direct the flue gas (and any heat carried thereby) toward the flue gas heat exchanger 118 along a fifth path (E). The flue gas heat exchanger 118 can then absorb at least a portion of the heat remaining in the flue gas to recycle the heat. For example, as further illustrated in FIG. 1, the air blower 116 can direct incoming air (or other oxygen-carrying gas) along a sixth path (F) toward the flue gas heat exchanger 118. The flue gas heat exchanger 118 can then preheat and direct the air toward the combustion component 114 along a seventh path (G). By preheating the air, the flue gas heat exchanger 118 can reduce the temperature difference between the incoming air and the combustion temperature. As a result, the combustion component 114 does not need to raise the temperature of the incoming air as far to initiate combustion, thereby improving the efficiency of the combustion component 114. In another, similar example, the flue gas heat exchanger 118 can be coupled to the combustion fuel supply 12 to receive the combustion fuel along an eighth path (H). In this example, the flue gas heat exchanger 118 can preheat and direct the combustion fuel toward the combustion component 114 along the eighth path (H). As a result, the combustion component 114 does not need to raise the temperature of the incoming combustion fuel as far to initiate combustion, thereby improving the efficiency of the combustion component 114. In yet another example, the flue gas heat exchanger 118 can recycle the heat for an external appliance, such as a heating unit (e.g., an HVAC unit, water heater, steam boiler, and/or the like), a power generation device (e.g., a combined heat and power component 44, a thermionic device, thermoelectric device, thermoacoustic device, a fuel cell, and/or any other suitable power generator), and/or the like.

After absorbing heat from the flue gas, the flue gas heat exchanger 118 can direct the flue gas toward a carbon dioxide sequestration component 20 and/or an exhaust system along a ninth path (I). The carbon dioxide sequestration component 20 can remove at least a portion of the carbon dioxide from the exhaust when the combustion component operates at least partially on a hydrocarbon fuel. As a result, when the combustion component 114 operates at least partially on a hydrocarbon fuel, the carbon dioxide sequestration component 20 can reduce the carbon footprint associated with the pyrolysis system 100. In embodiments where the combustion component 114 operates on hydrogen gas (e.g., hydrogen gas generated by the pyrolysis reaction), the flue gas heat exchanger 118 can direct all of the flue gas to the exhaust system and/or another suitable destination.

As discussed above, the reaction chamber 112 uses heat from combustion component 114 to decompose hydrocarbons in a pyrolysis reaction. In a specific, non-limiting example, the pyrolysis fuel supply 10 is a natural gas pipeline and the reaction chamber 112 decomposes the methane, ethane, propane, and other hydrocarbons in the natural gas. The pyrolysis reaction can form byproducts, as well as various other organic compounds as a result of incomplete reactions and/or other reaction pathways. Some of these byproducts can damage and/or clog processing equipment downstream from the reactor and/or otherwise be unsuitable for inclusion in various end uses for the hydrogen gas. Accordingly, it is desirable to remove the byproducts in addition to the solid carbon and/or other byproducts, from the product stream from the reaction chamber 112.

As illustrated in the representative example of FIG. 1, the output from the reaction chamber 112 (sometimes also referred to herein as a "product stream") can first be directed to a pyrolysis product heat exchanger 120 along a tenth path (J). The pyrolysis product heat exchanger 120 can absorb at least a portion of the heat in the product stream (e.g., waste heat) to recycle the heat. For example, in the illustrated embodiment, the absorbed heat can be directed back to the combustion component 114 along an eleventh path K to help heat incoming combustion fuel, incoming air, and/or the like to a combustion temperature. Additionally, or alternatively, the heat can be directed back to the pyrolysis reactor 110 upstream from the combustion component 114 to preheat incoming combustion fuel, incoming air, and/or the like. Additionally, or alternatively, the heat can be directed back to the reaction chamber 112 by preheating incoming pyrolysis fuel (e.g., in a recuperator therein and/or coupled thereto), thereby reducing the volume of combustion fuel that must be consumed to heat the pyrolysis fuel to the desired reaction temperature. Additional details on examples of suitable recuperators are disclosed in U.S. Patent Publication No. 2022/0315424 to Ashton et. Al and U.S. Patent Publication No. 2022/0120217 to Ashton et. Al, each of which is incorporated herein by reference. Additionally, or alternatively, the heat can be directed to one or more heating units (e.g., an HVAC unit, water heater, steam boiler, and/or the like), a power generation device (e.g., the combined heat and power component 44, a thermionic device, thermoelectric device, fuel cell, thermoacoustic device, and/or any other suitable power generator), and/or the like.

After absorbing waste heat, the pyrolysis product heat exchanger 120 can direct the product stream toward a carbon separator 130 along a twelfth path (L). The carbon separator 130 removes a portion (or all) of the solid carbon in the product stream (e.g., carbon particulates) and directs the carbon toward a carbon processing system 30 along a thirteenth path (M). In various embodiments, the carbon separator 130 can include a cyclone separator, one or more filters (e.g., a mesh filter, a baghouse filter, and/or the like), a gas-liquid separator, and/or any other suitable separator.

The carbon separator 130 can then direct the product stream toward the first separator 140 along a fourteenth path (N). The first separator 140 can remove a portion (or all) of one or more compounds in the product stream. For example, as discussed in more detail below, partial reaction products (e.g., pyrolysis oil; asphaltenes; acetylene; carbon monoxide; carbon dioxide; water vapor; organic compounds (e.g., VOCs and/or SVOCs; other oils; waxes; and/or the like) emerge from the reaction chamber 112 as vapors. However, the byproducts can condense into a liquid and/or freeze into solids as the product stream cools. In a specific example, the compounds in the product stream condense into a liquid and/or solid at temperatures between about 40° C. and about 200° C. In another specific example, the temperature of the product stream is above 350° C. and the condensation point of the byproducts can be between about 40° C. and about 350° C. In another specific example, the temperature of the product stream is above 500° C. and the condensation point of the byproducts can be between about 40° C. and about 500° C. Accordingly, the first separator 140 removes the compounds from the product stream by cooling and/or condensing the product stream such that the compounds become liquid and/or solid while the hydrogen remains gaseous. Additional details on the implementation of the first separator 140 are discussed below with reference to FIGS. 2A-9.

The first separator 140 can collect the liquid and/or solid byproducts and direct them away from the product stream. In some embodiments, the first separator 140 (and/or another component coupled to the first separator 140) can direct a portion (or all) of the byproducts toward a byproduct processing component 40 along a fifteenth path (O). The processing component can then neutralize the byproducts (e.g., via another chemical reaction) to capture the carbon contained therein and/or eliminate the byproducts. In some embodiments, the first separator 140 (and/or another component coupled to the separator) can direct a portion (or all) of the byproducts back to the pyrolysis reactor 110 along a sixteenth path (P). The pyrolysis reactor 110 can then feed compounds back into the reaction chamber 112, which breaks down and/or further react at least a portion of the compounds. Purely by way of example, compounds removed from product stream can then be broken down into solid carbon, hydrogen gas, and/or various other compounds. As a result, the first separator 140 and the reaction chamber 112 can remove carbon in from byproducts, produce additional hydrogen gas, and/or neutralize byproducts in the product stream.

The product stream then flows from the first separator 140 (e.g., sometimes referred to herein as a separator for compounds with relatively high molecular weights) toward the second separator 150 (sometimes referred to herein as a separator for compounds with relatively low molecular weights) along a seventeenth flow path (Q). As one non-limiting example, some components of pyrolysis oils which can also be generated as a byproduct of the pyrolysis reaction, generally condense (or freeze) at lower temperatures than the others with higher molecular weight. As a result, in some embodiments, the product stream is not cooled enough by the first separator 140 to remove each compound in the byproducts from the product stream. Accordingly, in the representative embodiment illustrated in FIG. 1, the system includes the second separator 150 as an additional component to condense, freeze, absorb, adsorb, and/or otherwise remove additional byproduct compounds from the product stream (e.g., to remove VOCs from the product stream). In a specific, non-limiting example, the second separator 150 can include an absorption bed (e.g., an activated carbon absorption bed) that absorbs at least a portion of the additional byproduct compounds from the product stream as it passes through the second separator 150. In various embodiments, similar to the discussion above, the second separator 150 (and/or another component coupled to the second separator 150) can direct a portion (or all) of the compounds toward a processing component, back toward the pyrolysis reactor, and/or any other suitable endpoint to collect, process, and/or neutralize the byproducts. In some embodiments, the separator is not be necessary and/or is not included in the pyrolysis system 100.

The product stream can then flow from the second separator 150 toward the product compression and separator component 160 along an eighteenth flow path (R). The product compression and separator component 160 can remove various lingering impurities from the hydrogen gas (e.g., removing additional carbon particulates, unreacted pyrolysis fuel, other gaseous molecules, and/or the like) and compress the resulting products to increase the efficiency of their transportation. In some embodiments, the product compression and separator component 160 includes one or more sub-components, such as a byproduct absorber and/or separator, an adsorber, and/or separator, a compressor, a membrane separator, and/or various other suitable sub-components. In some embodiments, the product compression and separator component 160 is not be necessary and/or included with the pyrolysis system 100. In the illustrated embodiment, the product compression and separator component 160 can direct a portion of the resulting hydrogen gas back to the pyrolysis reactor 110 along a nineteenth flow path (S) (e.g., to be used in the combustion component 114). Additionally, or alternatively, the product compression and separator component 160 can direct unreacted pyrolysis fuel to the pyrolysis reactor 110, along a twentieth flow path (T), to be cycled through the reaction chamber 112 again.

As further illustrated in the representative example of FIG. 1, the product compression and separator component 160 can direct the resulting hydrogen gas product to a variety of end locations. For example, the product compression and separator component 160 can direct the hydrogen gas toward a hydrogen storage 50 (or local consumption point, such as the combustion component 114, a heating unit coupled to the pyrolysis system 100, a power generation component coupled to the pyrolysis system 100, and/or the like) along a twenty first path (U). The hydrogen storage can allow the hydrogen gas to be consumed locally as needed (e.g., during a peak demand for power). As used herein, local consumption can mean within the same building as the pyrolysis system 100, within the same property as the pyrolysis system 100, within a half mile of the pyrolysis system 100, within about 5 miles of the pyrolysis system 100, within an endpoint for public utilities (e.g., the consumption does not require any public utility line or public transportation means between the pyrolysis system 100 and the point of consumption), and/or the like. In another example, the product compression and separator component 160 can direct the hydrogen gas toward a hydrogen grid 52 (e.g., a public utility grid, such as a dedicated hydrogen grid) and/or into the natural gas grid along a twenty second path (V). In embodiments where the hydrogen gas is directed into the natural gas grid, a volume of the hydrogen directed into the natural gas grid can be controlled such that the hydrogen gas is less than about 20% of the gas, by volume, in the natural gas pipeline. Limiting the amount of hydrogen gas in the natural gas pipeline can limit risk associated with the hydrogen gas in the natural gas grid, while also helping to partially decarbonize the natural gas grid. In another example, the product compression and separator component 160 can direct the hydrogen gas to a supply grid for hydrogen-powered electronics, vehicles, machines, and/or the like. For example, the supply grid can provide the hydrogen gas to fuel cell electric vehicles (FCEVs), $H_2$ internal combustion engines (H2 ICE) powered vehicles, and/or the like. In yet another example, the product compression and separator component 160 can direct the hydrogen gas directly to a combined heat and power device 54 (e.g., rather than to the hydrogen storage 50) to be consumed. Examples of suitable combined heat and power devices are disclosed in U.S. Patent Publication No. 2022/0387952 to Groenewald et. al, and U.S. Patent Publication No. 2022/0120217 to Ashton et. al, each of which is incorporated herein by reference. Additionally, or alternatively, the product compression and separator component 160 can direct the hydrogen gas directly to a power generation device (e.g., a combustion engine, thermionic converter, linear generator, fuel cell, and/or other suitable power generator). In yet another example, the product compression and separator component 160 can direct the hydrogen gas toward a chemical processing component 56 that uses the hydrogen gas for various other chemical processing operations.

It will be understood that the system 100 described above can include various additional components. Purely by way of example, the system 100 can include additional processing components downstream from the product compression and separator component 160 (e.g., to further condition hydrogen gas for an endpoint), one or more intermediate processing components between the carbon separator 130 and the carbon processing system 30 (e.g., heat exchangers, cooling beds, and/or the like to help cool the solid carbon for further processing), and/or the like. Additionally, or alternatively, it will be understood that one or more of the system 100 omit various components illustrated in FIG. 1. Purely by way of example, the product stream exiting the second separator 150 can be directed directly to various endpoints instead of being directed into the product compression and separator component 160 (e.g., when the system 100 operates at a temperature and/or pressure suitable for the downstream usage).

Figure 2A:
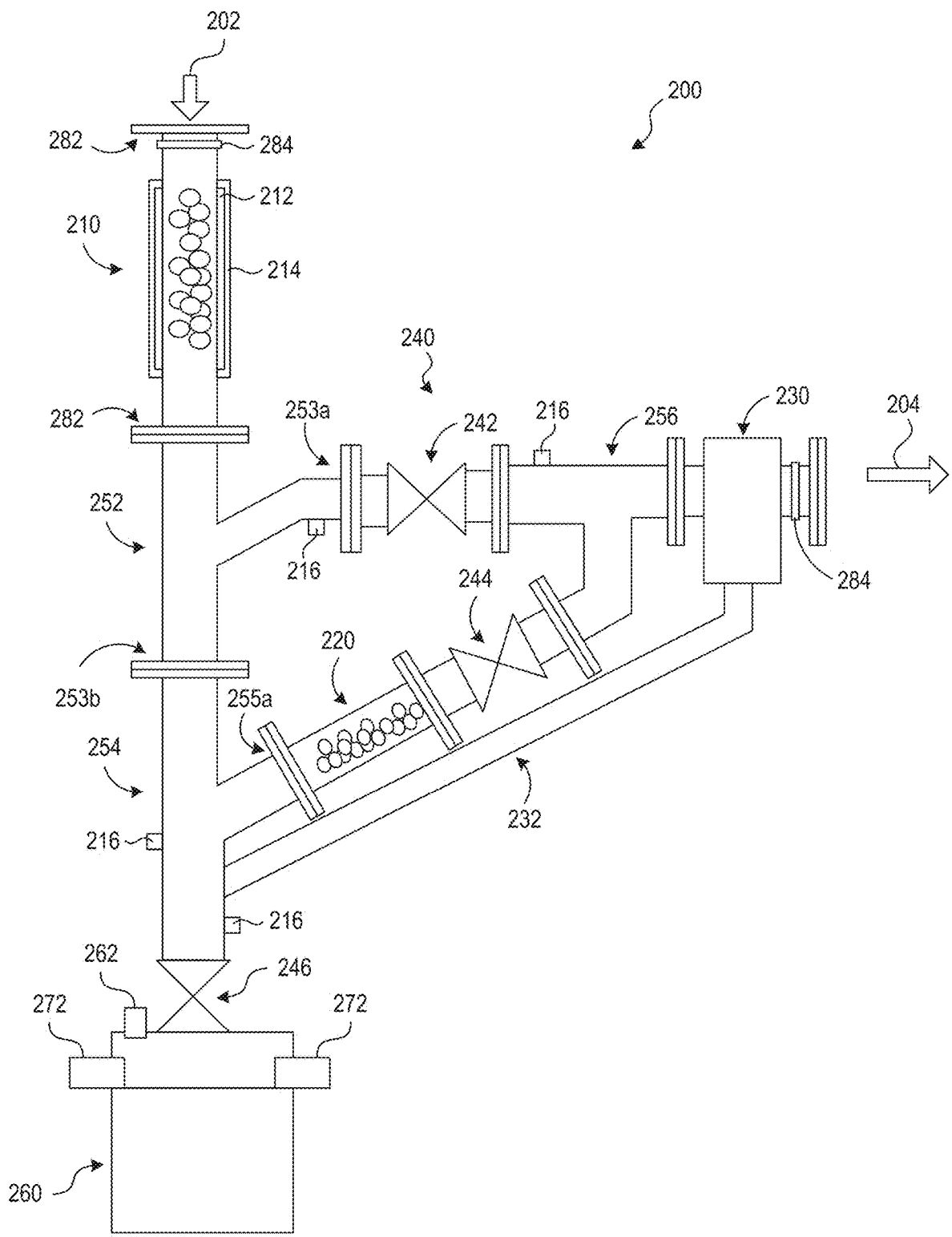
FIGS. 2A and 2B are partially schematic diagrams of a system for removing organic compounds from a product stream configured in accordance with embodiments of the present technology.
Figure 2B:
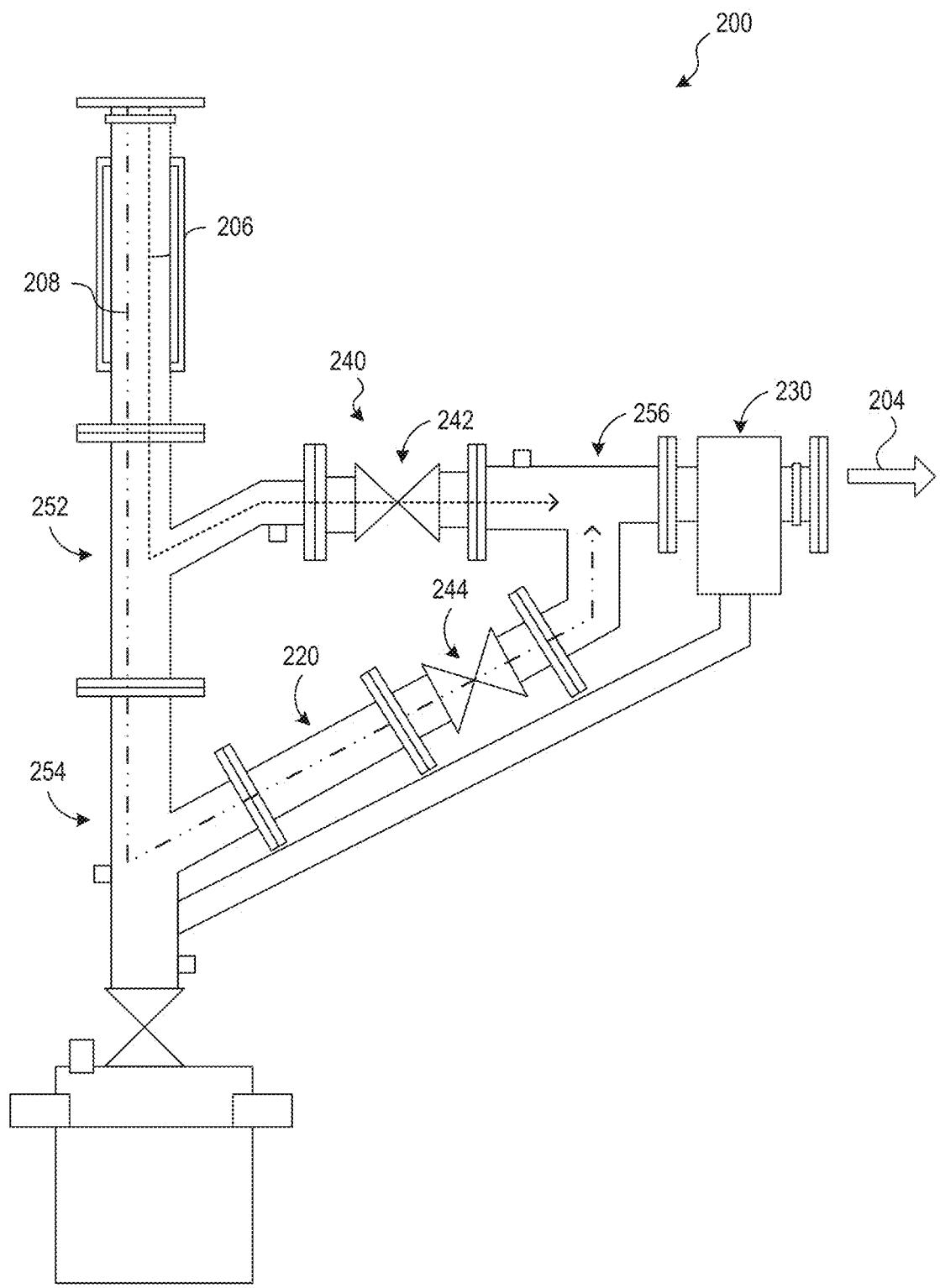

FIGS. 2A and 2B are partially schematic diagrams of a byproduct-scrubbing system 200 configured in accordance with some embodiments of the present technology. The byproduct-scrubbing system 200 ("system 200," sometimes also referred to herein as an "byproduct separator," a "product-scrubbing system," an "byproduct removal system," a "byproduct-scrubbing component," an "organic compound separator," an "organic compound removal system," and/or the like) can be used as the first separator 140 discussed above with reference to FIG. 1. However, it will be understood that, in some embodiments, the system 200 can be used in various other suitable settings that generate byproducts (e.g., other pyrolysis reactors, chemical processing facilities, manufacturing facilities (e.g., for manufacturing pesticides, cleaning agents, personal care products, solvents, and/or the like), and/or the like). In a specific, non-limiting, the system 200 can be included in a chemical processing facility to process a product stream that includes one or more organic compounds such as VOCs and/or SVOCs.

As illustrated in FIG. 2A, the system 200 includes an input channel 202 that is operably couplable to the product stream from a pyrolysis reactor (e.g., downstream from a carbon separation component), a first condenser 210 coupled to the input channel 202, and a first tee 252 downstream from the first condenser 210. The system 200 also includes a coalescer 230 downstream from a first output 253a of the first tee 252, a second tee 254 downstream from a second output 253b of the first tee 252, a second condenser 220 downstream from a first output 255a of the second tee 254, a third tee 256 downstream from the second condenser 220 and upstream from the coalescer 230, and a flow control component that controls movement of the product stream downstream from the first condenser 210. In the illustrated embodiment, the flow control component includes a set of valves 240 that includes a first valve 242 coupled between the first tee 252 and the third tee 256, and a second valve 244 coupled between the second condenser 220 and the third tee 256. As best illustrated in FIG. 2B, in a first state, the first valve 242 is open and the second valve 244 is closed, thereby establishing a first flow path 206 from to the coalescer 230 (through the first tee 252, the first valve 242, and the third tee 256) while obstructing a second flow path 208 to the coalescer 230 (through the first tee 252, the second tee 254, the second condenser 220, the second valve 244, and the third tee 256).

In some embodiments, the set of valves 240 can include a three-way valve positioned in the first tee 252 to direct the flow of the product stream along one or more flow paths. For example, when the three-way valve is in a first position, the three-way valve can direct the product stream along the first flow path 206, and when the three-way valve is in a second position, the three-way valve can direct the product stream along the second flow path 208. The set of valves 240 can include the three-way valve in addition to, or in alternative to, the first valve 242 and/or the second valve 244.

Returning to the description of FIG. 2A, while the set of valves 240 is in the first state, the first condenser 210 can cool the product stream (or absorb heat from the product stream), thereby causing byproducts in the product stream to transition from a vapor to a liquid (i.e., condense) and/or a solid (i.e., freeze) while the hydrogen (and any remaining unconverted, or partially converted, reactants, and other impurities) remains gaseous. To help cool the product stream, the first condenser 210 can include one or more heat exchangers (e.g., a shell and tube heat exchanger) and/or various active cooling components. In various embodiments, the first condenser 210 can cool the product stream to a temperature generally equal to (or less than) about 5° C., about 10° C., about 30° C., about 50° C., about 80° C., about 100° C., about 120° C., about 150° C., about 200° C., about 250° C., about 350° C., or about 500° C. As a result, the hydrogen flows through the first tee 252 along the first flow path while at least a portion of the byproducts retained in the first condenser 210. In some embodiments, the liquid byproducts from the product stream can then drain through the second tee 254 toward a reservoir 260. For example, the reservoir 260 can be downstream and/or downhill from (e.g., at a lower elevation than) the first condenser 210, allowing gravity to passively pull the liquids byproducts toward reservoir 260 while the product gas continues along the first flow path.

As the product stream flows through the coalescer 230, the coalescer 230 can absorb and/or otherwise remove additional byproducts (e.g., lighter weight hydrocarbons, hydrocarbons that did not fully condense in the first condenser 210, and/or the like) from the product stream. To do so, the coalescer 230 can include one or more coalescing filters (e.g., a mechanical coalescing filter, an electrostatic coalescing filter, and/or the like), an absorber bed (e.g., an activated carbon bed and/or the like), and/or various other suitable components. In some embodiments, the coalescer 230 further cools the product stream (e.g., to remove byproducts with a lower boiling and/or melting point than byproducts removed in the first condenser 210 sequentially). For example, in various embodiments, the coalescer 230 can cool the product stream to a temperature generally equal to (or less than) about 5° C., about 10° C., about 30° C., about 50° C., about 80° C., about 100° C., about 120° C., about 150° C., about 200° C., about 250° C., or about 350° C.

Together, the first condenser 210 and the coalescer 230 can remove all (or almost all) of the byproducts carried in the product stream at the input channel 202. The coalescer 230 can then emit the product stream into an output channel 204. In the illustrated embodiment, the coalescer 230 also includes a coalescer drain 232 establishing a path between the coalescer 230 and the reservoir 260, allowing gravity to drain liquid byproducts accumulated in the coalescer 230 toward the reservoir 260.

Despite the passive draining, the byproducts can build up in the first condenser 210 as they are condensed and/or otherwise removed from the product stream. For example, the drain flow may be too slow to continuously drain the compounds from the product stream. In another example, solid byproducts can build up in the first condenser 210 (e.g., on a cooling element therein and/or due to the low temperature in the first condenser 210). The build-up can clog the first condenser 210, thereby impeding the flow of the product stream through the system 200 and increasing a pressure of the product stream in the input channel 202. To address the build-up, the system 200 can implement a regeneration process that partially (or fully) clears the condensed byproducts out of the first condenser 210.

During the regeneration process, the system 200 can move the set of valves from the first state to a second state where the first valve 242 is closed and the second valve 244 is open. In the second state, the set of valves 240 obstruct the first flow path to the coalescer 230 while establishing the second flow path. As a result, the product stream flows out of the first condenser 210, through the first and second tees 252, 254 and into the second condenser 220. After the set of valves is in the second state, the system 200 can heat the first condenser 210 (or stop actively cooling the first condenser 210). In some embodiments, the system 200 turns off a cooling component 212 coupled to the first condenser 210, and operates one or more heating components 214 (e.g., a heating tape, one or more heating wires, and/or the like). In embodiments where the first condenser 210 includes a shell and tube heat exchanger, the system 200 (e.g., via the heating components 214) can supply warm and/or hot liquid to one or more channels in the shell and tube heat exchanger. As the temperature rises in the first condenser 210, the solid and liquid byproducts are released (e.g., melted and/or drained) from the first condenser 210 and are pulled, by gravity, toward the reservoir 260 and/or flow along the second flow path. For example, without being bound by theory, in some embodiments, the solid byproducts melt and drain from the first condenser 210 (e.g., as pulled by gravity and/or another mechanism), and some of the liquid byproducts are evaporated into the product stream. The second condenser 220 can then cool the product stream (or otherwise absorb heat from the product stream), thereby causing compounds in the product stream to transition from vapor to liquid (or solid) to capture the byproducts in the second condenser 220. Similar to the first condenser 210, the second condenser 220 can include one or more heat exchangers (e.g., a shell and tube) that cool the product stream (or otherwise absorb heat from the product stream). Further, similar to the first condenser 210, the second condenser 220 can be above (e.g., at a higher elevation than) the reservoir 260 such that the liquids passively drain, as pulled by gravity) toward the reservoir 260 while the product stream continues into the coalescer 230. In some embodiments it is not required that gravity is used for liquids to drain and another mechanism such as vacuum, pumping, or similar may be used. These mechanisms can help similar systems operate in configurations or situations when it is not physically possible or otherwise desirable to arrange the components in a particular geometric configuration and/or can help accelerate the movement of the byproducts toward the reservoir 260.

Accordingly, during the regeneration process, the second condenser 220 captures the portion of vapor-phase byproducts in the product stream resulting from both the pyrolysis reaction and/or evaporation due to heating the first condenser 210. As a result, the second condenser 220 can allow the system 200 to empty the first condenser 210 without stopping the pyrolysis reaction and without letting the byproducts in the product stream escape downstream. Additionally, or alternatively, the second condenser 220 further cools the product stream (e.g., to remove byproducts with a lower boiling and/or melting point than byproducts removed in the first condenser 210). For example, in various embodiments, the second condenser 220 can cool the product stream to a temperature generally equal to (or less than) about 5° C., about 10° C., about 30° C., about 50° C., about 80° C., about 100° C., about 120° C., about 150° C., about 200° C., about 250° C., or about 350° C. As discussed in more detail below, the regeneration process can be implemented for a predetermined amount of time, until a pressure in the input channel 202 drops below a predetermined threshold, and/or until a temperature in the first condenser 210 reaches a predetermined threshold.

In some embodiments, as also discussed in more detail below, the system 200 reduces (or stops) the pyrolysis reaction during the regeneration in response to an emergency condition being detected. For example, a complete clog can cause the pressure upstream (and within) the system to spike rapidly. When the pressure spikes above a predetermined rate (e.g., more than 0.01 pounds per square inch per minute (PSI/min), 0.2 PSI/min, 0.5 PSI/min, 1 PSI/min, 2 PSI/min, and/or any other suitable rate), the system 200 (and/or the pyrolysis system 100 of FIG. 1) can reduce (or stop) the pyrolysis reaction to reduce the overall pressure in the system 200. As a result, the system 200 can reduce the chance of a failure from high pressures that could be dangerous to users and/or damage components of the system 200. The regeneration can then remove the clog and allow the system 200 to return to normal operation.

Once the regeneration is complete, the system 200 can cool the first condenser 210 (or allow the first condenser 210 to passively cool) to cool the product stream and begin capturing the byproducts in the first condenser 210 again. Once the temperature is below a predetermined threshold, the system 200 can move the set of valves 240 from the second state to the first state, (e.g., opening the first valve 242 and closing the second valve 244) such that the product stream returns to the first flow path. The predetermined temperature threshold is generally but not limited to less than about 500° C., less than about 350° C., less than about 200° C., less than about 80° C., less than about 50° C., or less than about 30° C. Moving the set of valves from the second state to the first state could also be triggered by an increase in the pressure upstream from the second condenser 220 which would indicate that the second condenser 220 is becoming blocked or saturated with byproducts requires regeneration, as described below.

Similar to the first condenser 210, the second condenser 220 can clog over time. To address the clogging, the system 200 can implement a secondary regeneration process on the second condenser 220. During the secondary regeneration process, the set of valves 240 is left in the first state (e.g., such that the second valve 244 is closed and the product stream flows along the first flow path) while the system 200 can heat the second condenser 220 (or stop actively cooling the second condenser 220). As the temperature in the second condenser 220 rises, the byproducts melt and drain toward the reservoir and/or evaporate and flow to the first flow path upstream from the coalescer 230. As a result, the byproducts built up in the second condenser 220 are removed from the second condenser 220 and captured in either the reservoir 260 or the coalescer 230. Accordingly, the secondary regeneration process can reset the second condenser 220 while the first condenser 210 is operating normally. Once the secondary regeneration is complete (e.g., after a predetermined time, after the second condenser 220 reaches a predetermined temperature, and/or the like), the system 200 cools the second condenser 220 (or allows the second condenser 220 to passively cool) to prepare for a future regeneration of the first condenser 210.

In some embodiments, the system 200 implements the secondary regeneration process after each regeneration of the first condenser 210 (sometimes also referred to herein as a primary regeneration). In some embodiments, the system 200 implements the secondary regeneration process after a predetermined number of primary regenerations and/or after a predetermined time. For example, the system 200 can implement the secondary regeneration process every two, three, four, five, ten, and/or any other suitable number of primary regenerations. In another example, the system 200 can implement the secondary regeneration process every hour, two hours, three hours, four hours, five hours, ten hours, 1 day, 5 days, 30 days, and/or any other suitable number of hours or days). In some embodiments, the system 200 implements the secondary regeneration process in response to a detected build-up in the second condenser 220. For example, when the pressure in the input channel 202 does not decrease below a predetermined threshold during the primary regeneration, the system 200 can determine that the second condenser 220 is at least partially clogged.

As further illustrated in FIG. 2A, the system 200 can include features that help purge the reservoir 260 and/or allow the reservoir 260 to be periodically changed. For example, the system 200 can include a third valve 246, a sensor 262, and one or more purge lines 272. The sensor 262 is positioned to measure a level of fluid in the reservoir 260. For example, the sensor 262 can include a radar-based level indicator, a weight-based sensor, a proximity sensor, an immersion sensor, and/or any other suitable sensor that measures a volume of fluid in the reservoir 260. As a result, the sensor 262 can indicate that the reservoir 260 is full and/or at (or above) a predetermined threshold, allowing the system 200 to execute a reservoir change.

The third valve 246 is coupled between the reservoir 260 and any of the first condenser 210, the coalescer 230, and the second condenser 220 to regulate (e.g., allow or prevent) byproducts to drain into the reservoir 260. During the reservoir change, the third valve 246 is closed to prevent the flow of byproducts out of the system 200 while the reservoir 260 is disconnected and replaced with an empty reservoir. As a result, the third valve 246 can reduce the chance that byproducts drain out of the system 200 while the reservoir 260 is replaced.

Before the reservoir 260 is disconnected, however, the purge lines 272 can purge any remaining space in the reservoir 260 with an inert gas (e.g., Argon, Nitrogen, Neon, Helium, sulfur hexafluoride, carbon dioxide, and/or Krypton). The inert gas can reduce the chance that any chemical reactions and/or combustion occur in the reservoir 260 before the reservoir is processed by another system (e.g., fed back into the pyrolysis reactor 110 of FIG. 1, allowing the byproducts to be decomposed). Similarly, when a new reservoir is connected to the system 200, the purge lines 272 can purge and fill the new reservoir with the inert gas to reduce (or eliminate) the chance that the byproducts will react in the new reservoir as they are collected. Additionally, the purge lines 272 can help prevent air and other contaminants in a new reservoir from being mixed into the product stream.

It will be understood that, in various embodiments, the system 200 can include additional components, rearrange various components discussed above, omit various components discussed above, and/or combine various components discussed above. For example, in some embodiments, one or more of the first and second tees 252, 254 can be combined. For example, the first tee 252 can be combined with the second tee 254 in a cross-tee configuration (e.g., a four-way junction). In such embodiments, the first condenser 210 is coupled to a first junction of the cross, the first valve 242 is coupled to a second junction of the cross along the first flow path, the second condenser 220 is coupled to a third junction of the cross along the second flow path, and the reservoir 260 is coupled to a fourth junction of the cross to allow liquid byproducts to drain out of the first and second flow paths.

In another example, as illustrated in FIG. 2A, the system 200 can also include one or more ports 216. The ports 216 (e.g., ball valves coupled to components of the system 200) provide access to an interior of the system 200 to sample the product stream within (e.g., to measure the temperature, pressure, composition, and/or the like). For example, in the illustrated embodiment, the system 200 includes ports upstream from the first valve 242, upstream from the coalescer 230 (e.g., on the third tee 256), upstream from the second condenser 220, and upstream from the reservoir 260. These locations allow the system 200 to be sampled in a variety of locations to monitor the pressure in the system, the temperature of the product stream, and/or the composition of the product stream to help monitor whether the system 200 is operating correctly. In some embodiments, the system 200 includes additional (or alternative) ports positioned in various other locations. Purely by way of example, the system 200 can include one or more ports coupled to the one or more purge lines 272 (e.g., to monitor a composition of the gas removed from the reservoir 260 by the purge lines).

In yet another example, the system 200 can omit the reservoir 260 and direct the byproducts to various other endpoints. In various such embodiments, the reservoir 260 can be replaced by features that recirculate all (or a portion) of the byproducts back to the pyrolysis reactor (e.g., along the sixteenth path (P) of FIG. 1) for further decomposition, direct all (or a portion) of the byproducts to a carbon collection system (e.g., to be combined with the carbon), and/or direct all (or a portion) of the byproducts to a combustion component to be combustion (e.g., if the system 200 is running in a state that allows $CO_2$ generation). In some embodiments, the reservoir 260 acts as an intermediate storage component ahead of other endpoints. For example, when the reservoir 260 is empties, it can provide the collected byproducts to a reaction chamber, combustion component, and/or carbon collection system for downstream uses.

In yet another example, and as further illustrated in FIG. 2A, the system 200 can also include one or more filters 282 positioned between various components of the first and second flow channels. For example, in the illustrated embodiment, the system 200 includes filters 282 (e.g., mesh screens and/or any other suitable filter) on both ends of the first condenser 210. The filters 282 can hold a packing material (e.g., spheres (such as ball bearings), wool, complex 3-D shapes, stainless steel materials, copper materials, ceramics, beads, carbon, and/or the other suitable materials) in the first condenser 210. The packing material helps improve gas/solid contact and to help transfer heat out of (and thereby cool) the product stream. In various embodiments, the packing material can include spheres (e.g., ball bearings), mesh, more complex shapes, honeycombs, and/or any other suitable shape. In various embodiments, the packing material can include stainless steel, copper, and/or any other suitable thermally conductive material. In some embodiments, the filters 282 are removable, allowing them to be cleaned and/or replaced over time to address a build-up of the solid particles.

In yet another example, and as further illustrated in FIG. 2A, the system 200 can also include one or more sensors 284 positioned to measure various conditions of the system 200 and/or the flow of the product stream into and/or out of the system 200. For example, the sensors 284 can include pressure sensors, flow meters, temperature sensors, ionization detectors and/or photoelectric detectors, and/or any other suitable sensor. In the illustrated embodiment, the system 200 includes the sensors 284 upstream from the first condenser 210 and downstream from the coalescer 230. In these positions, the sensors 284 can measure a pressure in the product stream upstream from the system 200, a drop in the pressure through the system 200, a drop in the flow rate through the system 200, and/or the like.

In yet another example, the system 200 can include one or more additional flow paths. For example, the second tee 254 can include four (or more) openings, thereby allowing a third flow path (and/or additional flow paths) to be coupled to the system downstream from the first condenser 210. The third flow path can include a third condenser that can remove byproducts from the product stream during a regeneration of the first and/or second condensers 210, 220. For example, in some embodiments, a regeneration of the first condenser 210 can require a sufficiently long period to require both the second flow path and the third flow path to support the regeneration. During a first portion of the regeneration, the product stream can be directed along the second flow path $P_2$ (see FIG. 2B) through the second condenser 220. Then, during a second portion of the regeneration, the product stream can be directed along the third flow path through the third condenser. Additionally, or alternatively, the third flow path can provide a back-up to the second flow path. For example, the third flow path can be used only when a regeneration condition is detected before a secondary regeneration is complete to allow both the first and second condensers 210, 220 to be regenerated at the same time.

Figure 3:
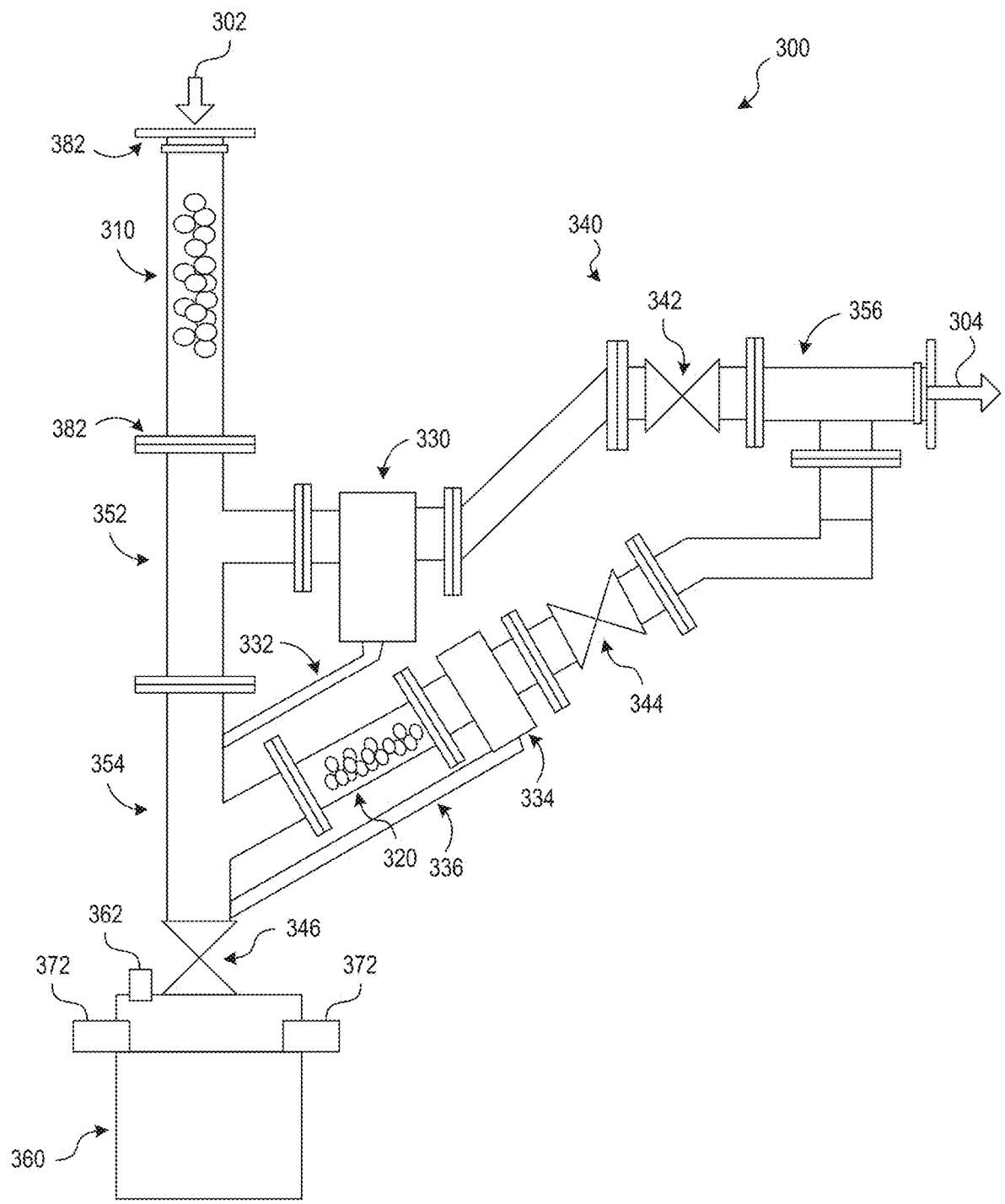
FIG. 3 is a partially schematic diagram of a system for removing organic compounds from a product stream configured in accordance with embodiments of the present technology.

FIG. 3 is a partially schematic diagram of a system 300 for removing byproducts from a product stream configured in accordance with embodiments of the present technology. As illustrated in FIG. 3, the system 300 is generally similar to the system 200 described above with reference to FIG. 2A. For example, the system 300 includes an input channel 302, a first condenser 310 coupled to the input channel 302, a second condenser 320 coupled to the first condenser 310, as well as a flow control component that controls a flow of the product stream through the system 300. In the illustrated embodiment, however, the system 300 includes a first coalescer 330 downstream from the first condenser 310 and a second coalescer 334 downstream from the second condenser 320.

In the illustrated exemplary embodiment, the flow control component includes first and second valves 342, 344 (sometimes referred to collectively as a "set of valves"). During normal operation, the set of valves is in a first state with the first valve 342 open and the second valve 344 closed. As a result, system 300 directs the product stream along a first flow path through the first condenser 310, a first tee 352, the first coalescer 330, the first valve 342, and into an output channel 304. As discussed above, the first condenser 310 cools the product stream to transition byproducts in the product stream from vapor to liquid (or solid), which can then drain toward a reservoir 360 (or other suitable component) through the first tee 352 and a second tee 354. The first coalescer 330 can then absorb (or otherwise capture) any remaining byproducts and drain them toward the reservoir through a first coalescer drain 332.

During a regeneration process, the set of valves is moved to a second state with the first valve 342 closed and the second valve 344 open. As a result, the system 300 directs the product stream along a second flow path through the first condenser 310, the first tee 352, the second tee 354, the second condenser 320, the second coalescer 334, the second valve 344, and into the output channel 304. Once the set of valves is in the second state, as discussed above, the system 300 can heat (or not actively cool) the first condenser 310. As the temperature rises, byproducts in the first condenser 310 melt and drain toward the reservoir 360 and/or evaporate from the first condenser 310. Because the first valve 342 blocks flow therethrough, the evaporated byproducts are carried along the second flow path, with the product stream, into the second condenser 320. The second condenser 320, can then cool the product stream to condense and collect the byproducts. The byproduct liquids can then drain from the second condenser 320, through the second tee 354, toward the reservoir 360 while the product stream flows into the second coalescer 334. The second coalescer 334 absorbs (or otherwise removes) at least a portion of any remaining byproducts from the product stream and drains them toward the reservoir 360 through a second coalescer drain 336.

In some embodiments, the system 300 also heats (or does not actively cool) the first coalescer 330 during the regeneration process. As a result, byproducts in the first coalescer 330 can melt and drain toward the reservoir 360 and/or evaporate from the first coalescer 330. However, because the first valve 342 is closed, the evaporated byproducts travel back through the first tee 352 and/or the first coalescer drain 332 into the second flow path toward the second condenser 320. Accordingly, the regeneration process can help reset both the first condenser 310 and the first coalescer 330 to reduce the build-up of byproducts (and/or other related compounds).

After the regeneration process, the system 300 can reset the set of valves to the first state (e.g., with the first valve 342 open and the second valve 344 closed), and optionally implement a secondary regeneration process to address a build-up of byproducts in the second flow path. For example, as discussed above, the system 300 can heat (or not actively cool) the second condenser 320, thereby causing byproducts therein to melt and drain toward the reservoir 360 and/or evaporate from the second condenser 320. Because the second valve 344 blocks flow therethrough, evaporated byproducts to the first flow path and are captured in the first coalescer 330. Additionally, the system 300 can heat (or not actively cool) the second coalescer 334. As a result, byproducts in the second coalescer 334 can melt and drain toward the reservoir 360 and/or evaporate from the second coalescer 334. However, because the second valve 344 is closed, the evaporated byproducts travel back through the second condenser 320 into the first flow path toward the first coalescer 330. Accordingly, the secondary regeneration process can help reset both the second condenser 320 and the second coalescer 334 to reduce the build-up of byproducts therein.

In some embodiments, the set of valves 340 can include a three-way valve positioned in the first tee 352 to direct the flow of the product stream along one or more flow paths. For example, when the three-way valve is in a first position, the three-way valve can direct the product stream along the first flow path through the first condenser 310 and the first coalescer 330, and when the three-way valve is in a second position, the three-way valve can direct the product stream along the second flow path through the second condenser 320 and the second coalescer 334. In various embodiments, the set of valves 340 can include the three-way valve in addition to, or in alternative to, the first valve 342 and/or the second valve 344. For example, the three-way valve can direct the flow of the product stream while the first and second valves 342, 344 help prevent byproducts from escaping along the first and second flow paths during a regeneration process. In the illustrated embodiment, the system 300 includes a third tee 356 downstream from the first and second valves 342, 344. The third tee 356 rejoins the first flow path and the second flow path upstream from the output channel 304 such that there is only one output from the system 300. However, it will be understood that, in some embodiments, the output channel 304 includes multiple subchannels, allowing the first and second flow paths to remain separate as they move out of the system 300. Purely by way of example, the subchannels can be coupled to different inputs on a gas compression component (e.g., the product compression and separator component 160 of FIG. 1), rather than rejoined by the third tee 356. In another example, the subchannels can be directed to different downstream devices such that the normal operation and regeneration processes supply hydrogen gas to different endpoints.

As further illustrated in FIG. 3, the system 300 can also include additional features related to the maintenance of the system 300. For example, similar to the system 200 discussed above with reference to FIG. 2A, the system 300 of FIG. 3 can include a third valve 346 positioned between the reservoir 360 and the second tee 354 to control the flow of byproducts draining from the first and/or second flow paths, a sensor 362 positioned to measure a volume of fluid in the reservoir 360, and one or more purge lines 372 positioned to purge the reservoir 360 and/or any new reservoir with an inert gas. Additionally, or alternatively, the system 300 can include one or more filters 382 (two illustrated in FIG. 3) that help hold a packing material in the first condenser 310. As discussed above, the packing material can help improve gas/solid contact and to remove heat from (and therefore cool) the product stream.

Further, in some embodiments, one or more of the first and second tees 352, 354 are combined. For example, the first tee 352 can be combined with the second tee 354 in a cross-tee configuration (e.g., a four-way junction). In such embodiments, the first condenser 310 is coupled to a first junction of the cross, the first coalescer 330 is coupled to a second junction of the cross along the first flow path, the second condenser 320 is coupled to a third junction of the cross along the second flow path, and the reservoir 360 is coupled to a fourth junction of the cross to allow liquid byproducts to drain out of the first and second flow paths. Relatedly, in some embodiments, the first coalescer drain 332 and the second coalescer drain 336 can meet at a junction (e.g., another tee) before draining toward the reservoir 360.

Still further, it will be understood that although the system 300 has been discussed primarily herein for use with a pyrolysis reactor, the system 300 can be used in various other suitable settings. For example, similar to the discussion above, the system 300 can be used in conjunction with other reactors, chemical processing facilities, manufacturing facilities (e.g., for manufacturing pesticides, cleaning agents, personal care products, solvents, and/or the like), and/or any other suitable setting to remove byproducts from a flow of gas or liquid. Additionally, or alternatively, it will be understood that various aspects of the system 300 can be omitted and/or replaced with other components discussed herein. For example, the reservoir 360 can be replaced with various suitable valves, pumps, and/or flow channels to direct the byproducts back to the pyrolysis reactor (e.g., to a reaction chamber and/or a combustion component), a carbon collection system, and/or any other suitable endpoint.

Figure 4A:
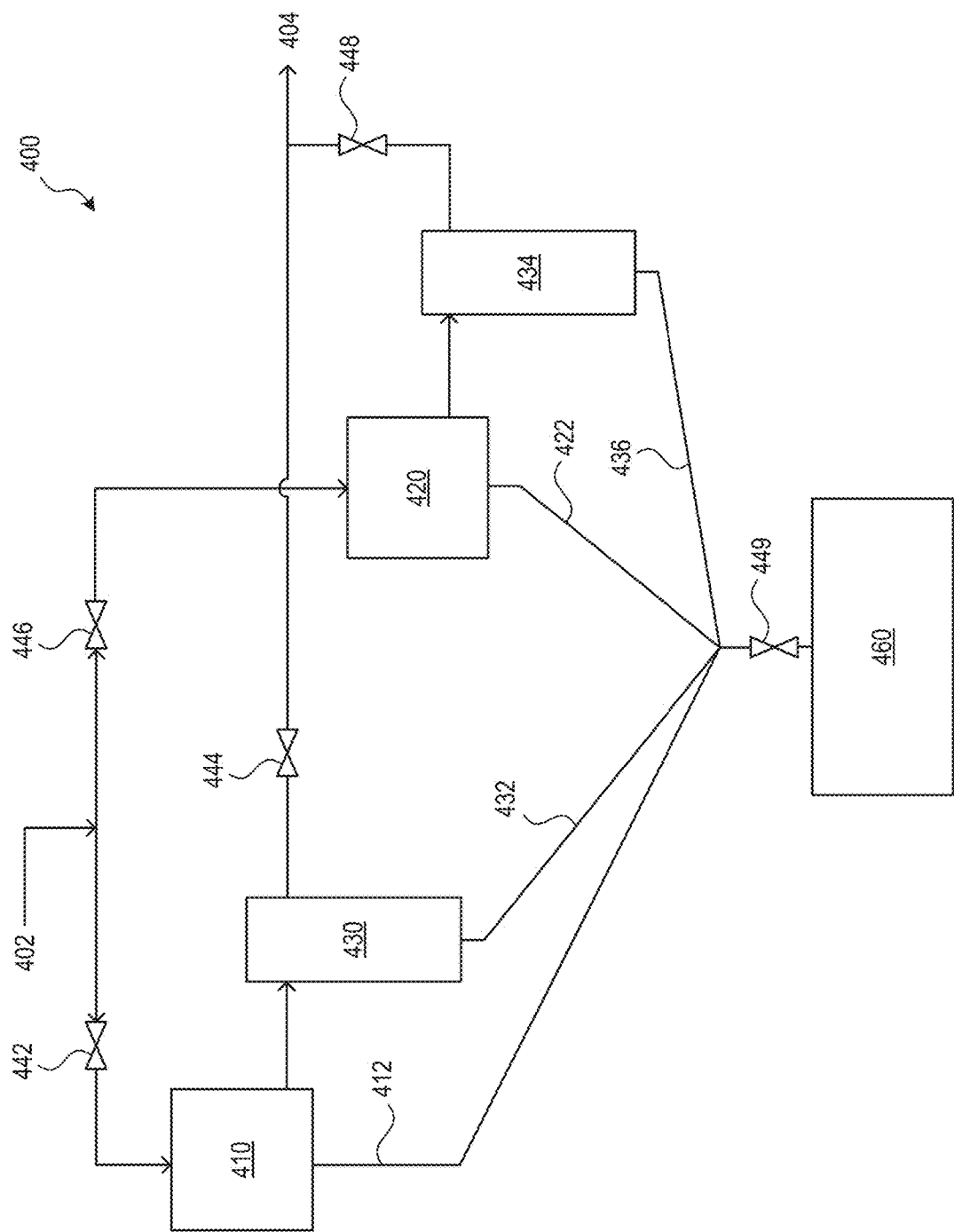
FIG. 4A is a partially schematic diagram of a system for removing organic compounds from a product stream configured in accordance with embodiments of the present technology.

FIG. 4A is a schematic diagram of a system 400 for removing byproducts from a product stream configured in accordance with embodiments of the present technology. As illustrated in FIG. 4A, the system 400 is generally similar to the systems 200, 300 described above with reference to FIGS. 2A and 3. In the illustrated embodiment, the system 400 includes an input channel 402, as well as a first valve 442, a second valve 444, a third valve 446, and a fourth valve 448 (sometimes referred to collectively as a "set of valves") that control a flow of the product stream through the system 400. For example, when the set of valves is in a first state with the first and second valves 442, 444 open and the third and fourth valves 446, 448 closed, the product stream moves along a first flow path. The first flow path goes through a first condenser 410 that is coupled to the input channel 402 downstream from the first valve 442, a first coalescer 430 that is coupled to the first condenser 410, then through the second valve 444 and into an output channel 404. Similar to the discussion above, the first condenser 410 can cool the product stream to condense (or freeze) byproducts therein. The condensed byproducts can then drain toward a reservoir 460 through a first drain path 412. The first coalescer can absorb (or otherwise remove) at least a portion of the byproducts remaining in the product stream after the first condenser 410. The absorbed byproducts can then drain toward the reservoir 460 along a second drain path 432. The system 400 can operate with the set of valves in the first state during normal operation, thereby removing byproducts from the product stream in the first condenser 410 and the first coalescer 430. However, similar to the discussion above, when byproducts build up in the first condenser 410 and/or the first coalescer 430, they start to clog the first flow path and the system 400 can implement a regeneration process.

To start the regeneration process, the set of valves is moved to a second state with the first and second valves 442, 444 closed and the third and fourth valves 446, 448 open. As a result, the product stream moves along a second flow path through a second condenser 420 that is coupled to the input channel 402 downstream from the third valve 446, a second coalescer 434 that is coupled to the second condenser 420, then through the fourth valve 448 and into the output channel 404. The second condenser 420 and the second coalescer 434 can remove byproducts from the product stream similar to the first condenser 410 and the first coalescer 430 discussed above. Byproducts removed by the second condenser 420 can then drain toward the reservoir 460 through a third drain path 422 while byproducts removed by the second coalescer 434 drain toward the reservoir 460 through a fourth drain path 436.

Further, with the first and second valves 442, 444 closed, the system 400 can heat (or stop actively cooling) the first condenser 410 and/or the first coalescer 430. As a result, byproducts built up in the first condenser 410 and/or the first coalescer 430 can melt and drain toward the reservoir 460 and/or evaporate and flow toward the reservoir 460. In the illustrated embodiment, the evaporated byproducts can also flow toward the reservoir 460 through the first and second drain paths 412, 432. Additionally, or alternatively, they can flow up through the third and fourth drain paths 422, 436 toward the second condenser 420 and the second coalescer 434, where they are captured and drained back toward the reservoir 460.

After the regeneration process, the system 400 can reset the set of valves to the first state and continue normal operation through the first condenser 410 and the first coalescer 430. Additionally, the system 400 can implement a secondary regeneration process to reduce a build-up of byproducts in the second condenser 420 and/or the second coalescer 434. The secondary regeneration process can be implemented after every regeneration process, after a predetermined number of regeneration processes, in response to a detected build-up, after a predetermined time, and/or the like.

Further, the system 400 allows the reservoir 460 to be periodically reset (e.g., emptied and/or swapped for a new reservoir). For example, in the illustrated embodiment, the system 400 includes a fifth valve 449 between the reservoir 460 and each of the drain paths. When the reservoir 460 is full and/or otherwise needs to be reset, the system 400 can close the fifth valve 449 to prevent (or obstruct) byproducts from flowing therethrough and reset the reservoir 460. In some embodiments, as discussed above, the reset can include one or more purges of the reservoir 460 and/or a new reservoir installed in the system 400 to reduce (or prevent) chemical reactions with the byproducts removed from the system 400 and/or to prevent air from mixing with the product stream.

In the embodiments of FIG. 4A discussed above, the first and second flow paths are implemented exclusively. However, it will be understood that the technology is not so limited. For example, in some embodiments, the first-fourth valves 442-448 are all open, allowing the product stream to flow along both the first and second flow paths. The mutual flow paths can be useful, for example, during periods of high demand (e.g., such that the volumetric flow of the product stream is high) and/or while transitioning between normal operation and a regeneration process (and vice versa). In another example, the first valve 442 can be open during the regeneration process, allowing evaporated byproducts from the first condenser 410 and/or the first coalescer 430 to flow through the first valve 442 and into the second flow path. Similarly, the third valve 446 can be opened during a secondary regeneration process, allowing evaporated byproducts from the second condenser 420 and/or the second coalescer 434 to flow through the third valve 446 and into the first flow path. In yet another example, each of the first-fourth valves 442-448 can be closed to implement a full regeneration process (e.g., when the pyrolysis reactor is not operating, the system 400 can be closed to force any flow of byproducts directed toward the reservoir 460). In some embodiments, the condensers and coalescers are interconnected to allow, for example, flow from the first condenser 410 to the second coalescer 434 and/or from the second condenser 420 to the first coalescer 430.

Further, it will be understood that, in some embodiments, one or more of the first-fourth valves 442-448 can be combined. Purely by way of example, the first valve 442 and the third valve 446 can be a single, three-way valve that is positioned to control the flow of the product stream along one or more flow paths. For example, when the three-way valve is in a first position, the three-way valve can direct the product stream along the first flow path through the first condenser 410 and the first coalescer 430, and when the three-way valve is in a second position, the three-way valve can direct the product stream along the second flow path through the second condenser 420 and the second coalescer 434. Additionally, or alternatively, the second valve 444 and the fourth valve 448 can be combined in a three-way valve controlling the flow out of the first and second flow paths. Alternatively, there may be multiple parallel paths for regeneration (e.g., more than two sets of valves, condensers, and/or coalescers each in parallel).

Still further, it will be understood that although the system 400 has been discussed primarily herein for use with a pyrolysis reactor, the system 400 can be used in various other suitable settings. For example, as similar to the discussion above, the system 400 can be used in conjunction with other reactors, chemical processing facilities, manufacturing facilities (e.g., for manufacturing pesticides, cleaning agents, personal care products, solvents, and/or the like), and/or any other suitable setting to remove byproducts from a flow of gas or liquid.

Figure 4B:
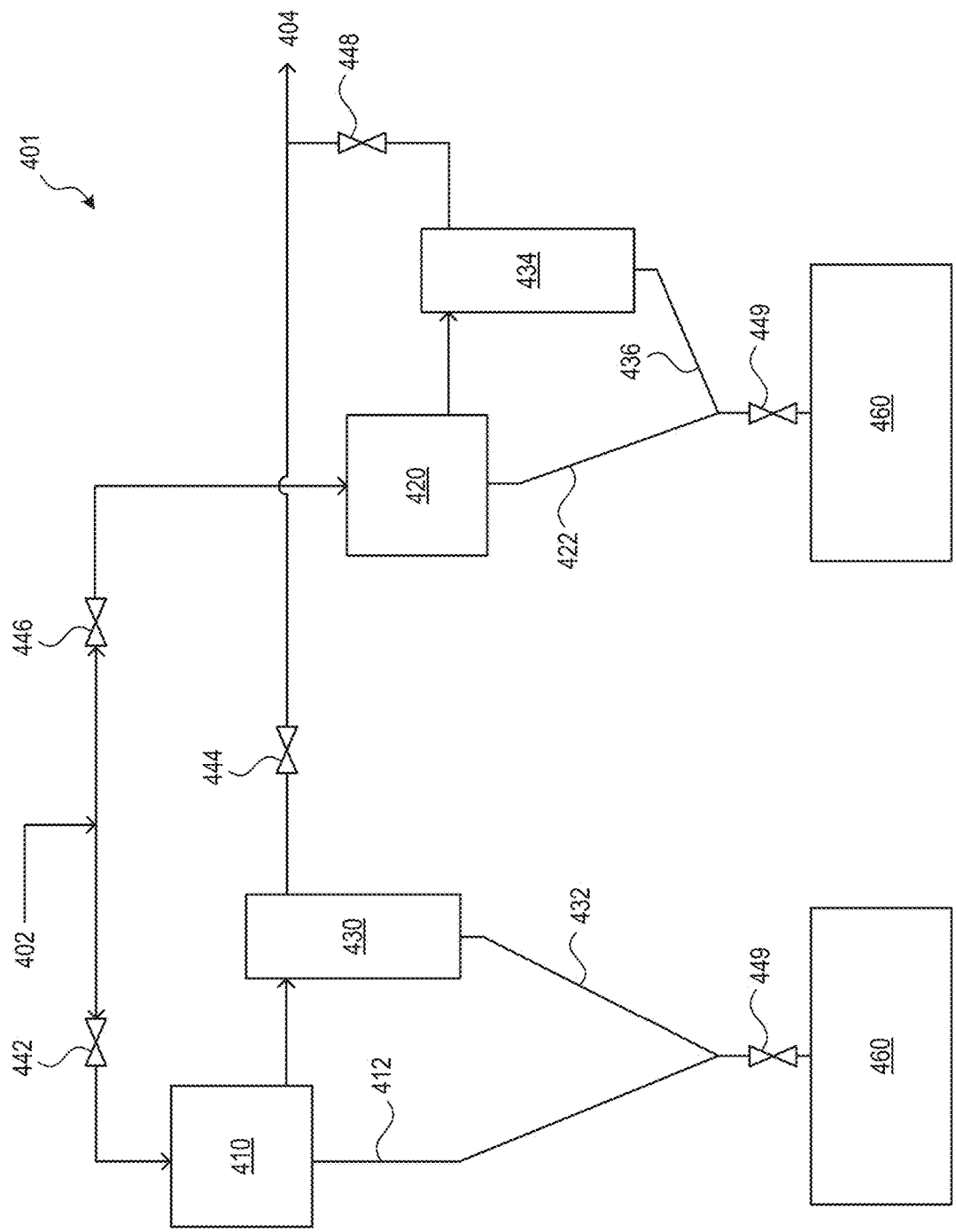
FIG. 4B is a partially schematic diagram of a system for removing organic compounds from a product stream configured in accordance with further embodiments of the present technology.

FIG. 4B is a partially schematic diagram of a system 401 including multiple reservoirs in accordance with embodiments of the present technology. More specifically, the system 401 includes features generally similar to the system 400 of FIG. 4A, modified to include a first reservoir 460A for the first flow path (e.g., from the input channel 402, through first valve 442, the first condenser 410, the first coalescer 430, and the second valve 444, and out of the output channel 404) and a second reservoir 460B for the second flow path (e.g., from the input channel 402, through the third valve 446, the second condenser 420, the second coalescer 434, and the fourth valve 448, and out of the output channel 404). Said another way, the system 401 of FIG. 4B creates fully parallel first and second flow paths, including regeneration pathways (e.g., the first and second reservoirs 460A, 460B) that regenerate the first and second flow paths. As a result, for example, the first flow path can be regenerated without any risk that the organic compounds route around the second flow path (e.g., by flowing backward through the fourth drain path 436 of FIG. 4A). Additionally, or alternatively, the multiple reservoirs 460 can help expand an overall capacity of the system 400, thereby requiring the reservoirs 460 to be changed less frequently. Additionally, or alternatively, the system 400 can monitor the first and second reservoirs 460A, 460B to schedule reservoir changes/emptying cycles to be completed between regenerations of the first and second flow paths (e.g., changing the first reservoir 460A after regenerating the first flow path).

Figure 5:
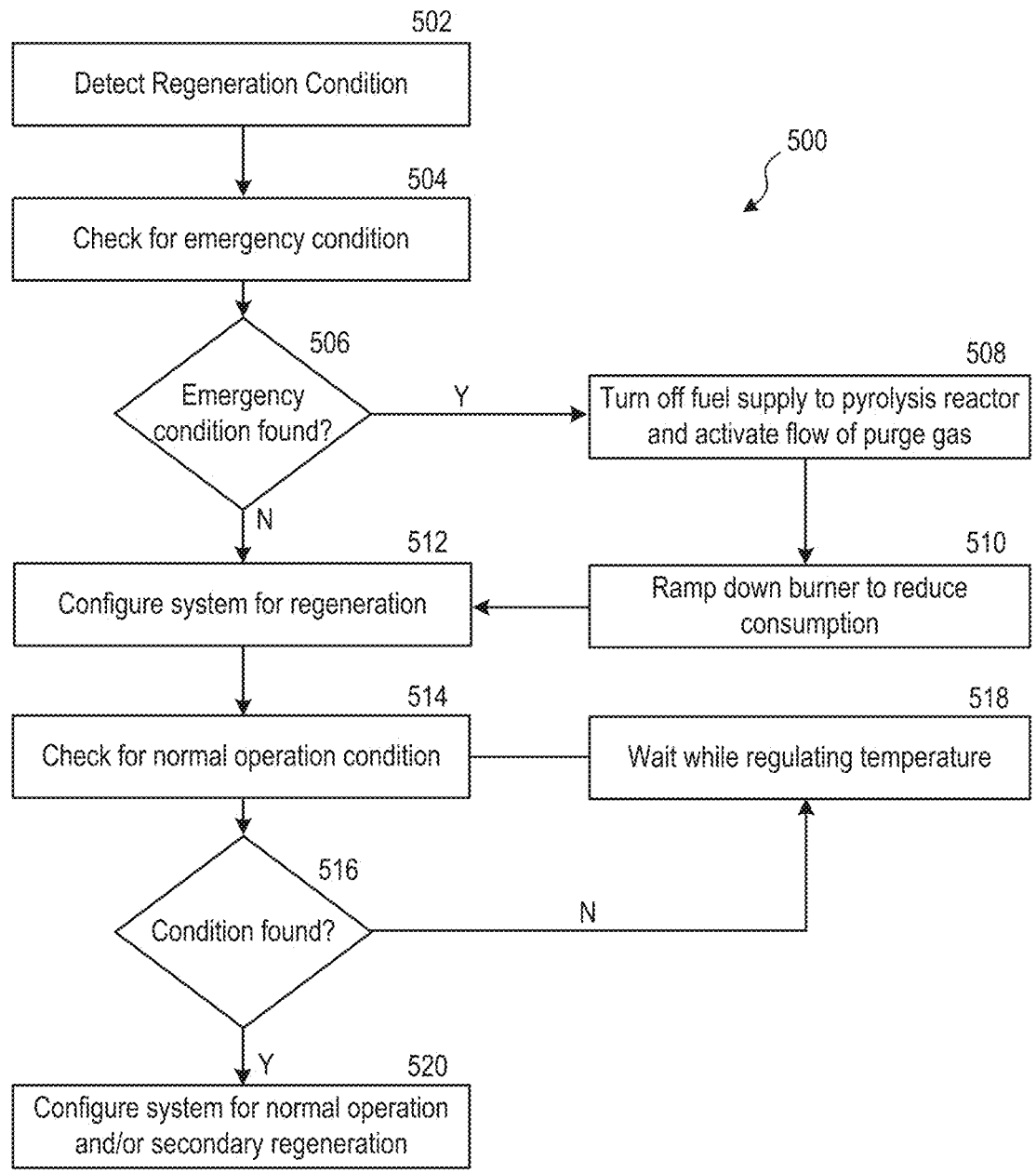
FIG. 5 is a flow diagram of a process for removing organic compounds from a product stream in accordance with embodiments of the present technology.

FIG. 5 is a flow diagram of a process 500 for removing byproducts from a product stream in accordance with embodiments of the present technology. The process 500 can control various components of a pyrolysis system (e.g., the pyrolysis system 100 of FIG. 1), such as a pyrolysis reactor and/or the byproduct separating system coupled to the pyrolysis reactor. The process 500 can be implemented by a controller in any of the systems 200, 300, 400 discussed above with reference to FIGS. 2A-4B, a controller in the pyrolysis system 100 discussed above with reference to FIG. 1, and/or any suitable controllers coupled thereto. In some embodiments, for example, the pyrolysis system 100 includes a controller with a processor and a non-transitory memory device storing instructions that, when implemented by the processor cause the controller to implement the process 500.

The process 500 begins at block 502 by detecting a regeneration condition. In various embodiments, the regeneration condition can be a time since last regeneration that is above a predetermined threshold (e.g., 1 hour, 2 hours, 4 hours, 5 hours, 1 day, 5 days, or 30 days, and/or any other period); a pressure upstream from the first condenser (e.g., in the input channel 202 of FIG. 2A) above a predetermined threshold (e.g., 0.01 pound per square inch (PSI), 0.5 PSI, 1 PSI, 2 PSI, 4 PSI, 10 PSI, 20 PSI, 100 PSI, 1000 PSI, and/or any other pressure); a rate of increase in the pressure upstream from the first condenser above a predetermined threshold (e.g., increasing by more than 0.01 PSI/minute (PSI/min), 0.1 PSI/min, 0.5 PSI/min, 0.7 PSI/min, 1 PSI/min, 2 PSI/min, 10 PSI/min, 20 PSI/min, 100 PSI/min, 1000 PSI/min, and/or any other rate of increase); a drop in the flow rate between the input and output channels (e.g., the input and output channels 202, 204 of FIG. 2A) above a predetermined threshold (e.g., a 50% drop, a 30% drop, a 25% drop, a 10% drop, and/or any other suitable drop); and/or the like. The regeneration condition can indicate that byproducts are building up in the byproduct separating system and impeding the flow of the product stream. As a result, the build-up can dangerously increase the pressure in the byproduct separating system and/or reduce the efficacy of the byproduct separating system. Alternatively, the regeneration condition can indicate that the byproduct separating system should be regenerated to avoid a build-up of compounds that would impede the flow of the product stream.

At block 504, the process 500 includes checking for an emergency condition related to the regeneration condition. The emergency condition can indicate that a normal regeneration may be insufficient to safely address the build-up of byproducts, for example when the pressure in (or upstream from) the byproduct separating system will increase above a predetermined safety level before the regeneration can reduce the build-up. For example, the emergency condition can include a pressure upstream from the first condenser above a predetermined threshold (e.g., 5 PSI, 10 PSI, 15 PSI, 20 PSI, 50 PSI, 100 PSI, 1000 PSI, and/or any other pressure); a rate of increase in the pressure upstream from the first condenser above a predetermined threshold (e.g., increasing by more than 0.5 PSI/min, 0.7 PSI/min, 1 PSI/min, 2 PSI/min, and/or any other rate of increase); and/or any other suitable condition. At decision block 506, if the process 500 found an emergency condition, the process 500 moves to block 508 to address the emergency condition, else the process 500 moves to block 512.

At block 508, the process 500 includes turning off a reactant fuel supply to the pyrolysis reactor and, in some embodiments, activating a flow of purge gas. By turning off the reactant fuel supply, the process 500 can reduce (or eliminate) the incoming product stream, thereby reducing (or eliminating) the chance that the pressure will rise above a dangerous threshold and/or cause deleterious effects (e.g., a leak in the byproduct separating system) while a regeneration process addresses build-ups in the byproduct separating system. The purge gas can be an inert gas that helps carry compounds evaporated during the regeneration through the byproduct separating system without introducing a molecule that might react with the byproduct compounds.

At block 510, the process 500 includes ramping down a heating component (or other suitable reaction-driving component, such as a microwave element) for the pyrolysis reactor to reduce energy consumption while the pyrolysis reactor is not decomposing hydrocarbons. In a specific, non-limiting example, the process 500 at block 510 can include ramping down a combustion component of the pyrolysis reactor (e.g., the combustion component 114 of FIG. 1) to reduce the consumption of the combustion component while the pyrolysis reactor is not decomposing hydrocarbons. In some embodiments, the heating component is shut off completely. In other embodiments, the heating component is ramped down below a predetermined consumption threshold to maintain the pyrolysis reactor at (or near) the reaction temperature during the regeneration.

At block 512, the process 500 includes configuring the byproduct separating system for regeneration. For example, as discussed herein, the process 500 at block 512 can include opening one or more valves in the byproduct separation system and/or closing one or more valves to direct the product stream along a second flow path through a second condenser downstream from the first condenser. For example, as discussed with respect to FIG. 2A, the first valve 242 can be closed while the second valve 244 is opened to establish the second flow path. Once the valves are configured, the process 500 at block 512 can include heating (or not actively cooling) the first condenser and/or a first coalescer in the byproduct separating system. In various embodiments, heating the first condenser and/or the first coalescer includes turning off one or more cooling elements, wrapping the first condenser and/or the first coalescer with an insulating element (e.g., a foil), and/or operating one or more heating components (e.g., heating tapes, heating coils, and/or the like). As a result, the temperature in the first condenser and/or the first coalescer can increase. In response to the increase in temperature, solids in the condenser and/or the first coalescer can melt and drain toward the reservoir. Further, liquids in the first condenser and/or the first coalescer can evaporate out of and/or drain more quickly from the first condenser and/or the first coalescer.

At block 514, the process 500 includes checking for a normal operation condition. For example, the normal operation condition can include that the pressure upstream from the byproduct separating system is below a predetermined baseline, indicating that the build-up of byproduct in the first condenser and/or the first coalescer has been sufficiently reduced (or eliminated). Additionally, or alternatively, the normal operation condition can include that the first condenser and/or the first coalescer are at a predetermined temperature (e.g., about 5° C., about 10° C., about 30° C., about 50° C., about 80° C., about 100° C., about 120° C., about 150° C., about 200° C., about 250° C., about 350° C., about 500° C. and/or any other suitable temperature) and/or that the regeneration has been going on for a predetermined amount of time (e.g., more than 30 minutes, 45 minutes, 1 hour, and/or any other suitable period). The temperature above a threshold and/or the regeneration for a predetermined time can be used as shorthand to determine that a sufficient regeneration has occurred. Additionally, or alternatively, they can trigger normal operation when a build-up of byproduct in the second condenser and/or the second coalescer causes an increase in upstream pressure above a predetermined baseline. At decision block 516, if a normal operation condition is found, the process 500 moves to block 520 to resume normal operation, else the process 500 moves to block 518.

At block 518, the process 500 includes waiting a preset period before returning to block 514 to re-check for the normal operation condition. The preset period can be 5 minutes, 10 minutes, 15 minutes, 30 minutes, 1 hour, and/or any other suitable period that allows regeneration to occur and move byproducts out of the first condenser and/or the first coalescer.

In some embodiments, the process 500 at block 518 includes regulating the temperature in the first condenser and/or the first coalescer to help ensure that byproducts can evaporate and/or otherwise flow out of the first condenser and/or the first coalescer. Purely by way of example, the process 500 can maintain the first condenser and/or the first coalescer at about 100° C. In some embodiments, the temperature regulation is implemented by continuously driving the heating unit. For example, heating tape, a line heater, a burner, and/or another suitable heating mechanism can be controlled or self-regulated to maintain a preset temperature. Accordingly, the process 500 can regulate the temperature in the first condenser and/or the first coalescer by continuously powering the heating tape, a line heater, a burner, and/or other suitable heating mechanism.

At block 520, the process 500 includes configuring the byproduct separating system for normal operation. For example, similar to the discussion above, the process 500 at block 520 can include cooling the first condenser and/or the first coalescer to prepare to remove byproducts from the product stream. Once the first condenser and/or the first coalescer are cooled, the process 500 at block 520 can include opening one or more valves and/or closing one or more valves to direct the product stream along the first flow path through the first condenser and/or the first coalescer, without traveling through the second condenser. Additionally, in regeneration cycles where an emergency condition was detected, the process 500 at block 520 can include ramping up the combustion component and/or opening the reactant fuel supply to restart the pyrolysis reactor.

Figure 6:
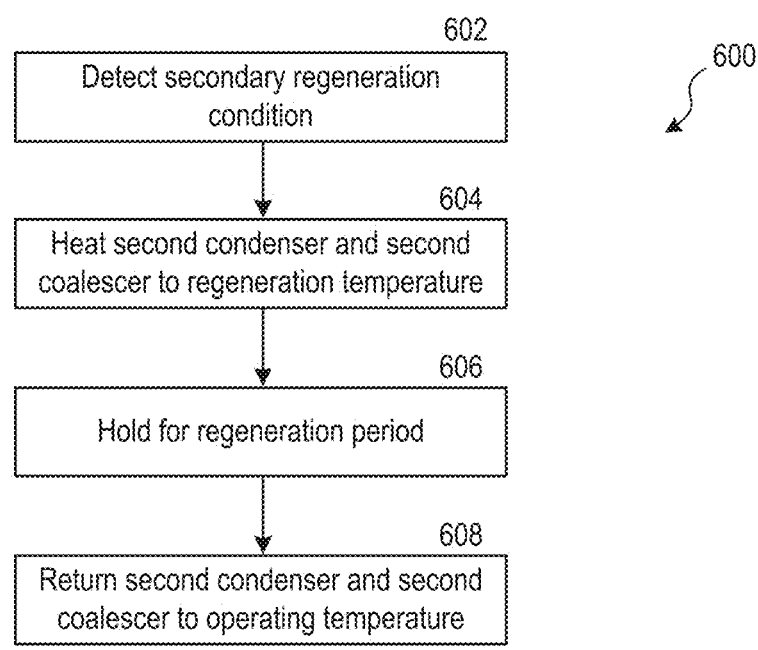
FIG. 6 is a flow diagram of a process for resetting a system for removing organic compounds from a product stream in accordance with embodiments of the present technology

FIG. 6 is a flow diagram of a process 600 for a secondary regeneration of a byproduct separating system in accordance with further embodiments of the present technology. The process 600 can control various components of the pyrolysis system (e.g., various components of the pyrolysis system 100 of FIG. 1), such as the pyrolysis reactor and/or the byproduct separating system coupled to the pyrolysis reactor. Similar to the discussion above, the process 600 can be implemented by a controller in any of the systems 200, 300, 400 discussed above with reference to FIGS. 2A-4B, a controller in the pyrolysis system 100 discussed above with reference to FIG. 1, and/or any suitable controllers coupled thereto.

The process 600 begins at block 602 by detecting a secondary regeneration condition. The secondary regeneration condition can include the occurrence of a preset number of primary regenerations (e.g., a regeneration according to the process 500 of FIG. 5), such as after every primary regeneration or every 2, 3, 5, 10, and/or any other suitable number of primary regenerations. Additionally, or alternatively, the secondary regeneration condition can include a lack of a drop in pressure in the input channel during the primary regeneration process (e.g., when the pressure does not drop (or does not drop below a baseline) after 30 minutes, 45 minutes, 1 hour, and/or any other suitable time); a pressure increase in the input channel during the primary regeneration process; a pressure detected upstream from the second condenser and/or the second coalescer (e.g., from a sensor positioned in the byproduct separating system) higher than a pressure upstream from the first condenser; and/or the like.

At block 604, the process 600 includes heating (or not actively cooling) the second condenser and/or the second coalescer. Similar to the discussion above, heating the second condenser and/or the second coalescer can include turning off one or more cooling elements, wrapping the second condenser and/or the second coalescer with an insulating element (e.g., a foil), and/or operating one or more heating components (e.g., heating tapes, heating coils, a burner, a line heater, and/or the like) coupled to the second condenser and/or the second coalescer. As a result, the temperature in the second condenser and/or the second coalescer can increase, causing the byproducts in the second condenser and/or the second coalescer to melt, evaporate, and/or drain more quickly from the second condenser and/or the second coalescer.

As discussed above, the secondary regeneration occurs while the valves in the byproduct separating system block (or obstruct) flow along the second flow path (e.g., from the second condenser and/or the second coalescer directly toward an output flow). Accordingly, the byproducts leaving the second condenser and/or the second coalescer either flow into the reservoir or into the first flow path to be captured by the first condenser and/or the first coalescer.

At block 606, the process 600 holds for a regeneration period. The regeneration period can be preset based on an expected time to regenerate the second condenser and/or the second coalescer, such as 5 minutes, 10 minutes, 15 minutes, 20 minutes, 30 minutes, 1 hour, and/or any other suitable period. Additionally, or alternatively, the regeneration period can last until the second condenser and/or second coalescer reach a target temperature for the secondary regeneration. In some embodiments, the length of the regeneration period can be based at least partially on the regeneration condition detected at block 602. For example, a first secondary regeneration triggered by the preset number of primary regenerations is analogous to routine maintenance while a second secondary regeneration triggered by an increase in pressure detected during the primary regeneration is responsive to a detected clog in the second condenser and/or the second coalescer. Accordingly, the first secondary regeneration can have a shorter regeneration period than the second secondary regeneration. In this example, the first secondary regeneration saves energy costs associated with the secondary regeneration while the second secondary regeneration more completely flushes the second condenser and/or the second coalescer.

At block 608, the process 600 includes returning the second condenser and/or the second coalescer to an operating temperature. For example, the process 600 can include re-cooling the second condenser and/or the second coalescer so that they are ready for the next primary regeneration when the system detects a primary regeneration condition.

Figure 7A:
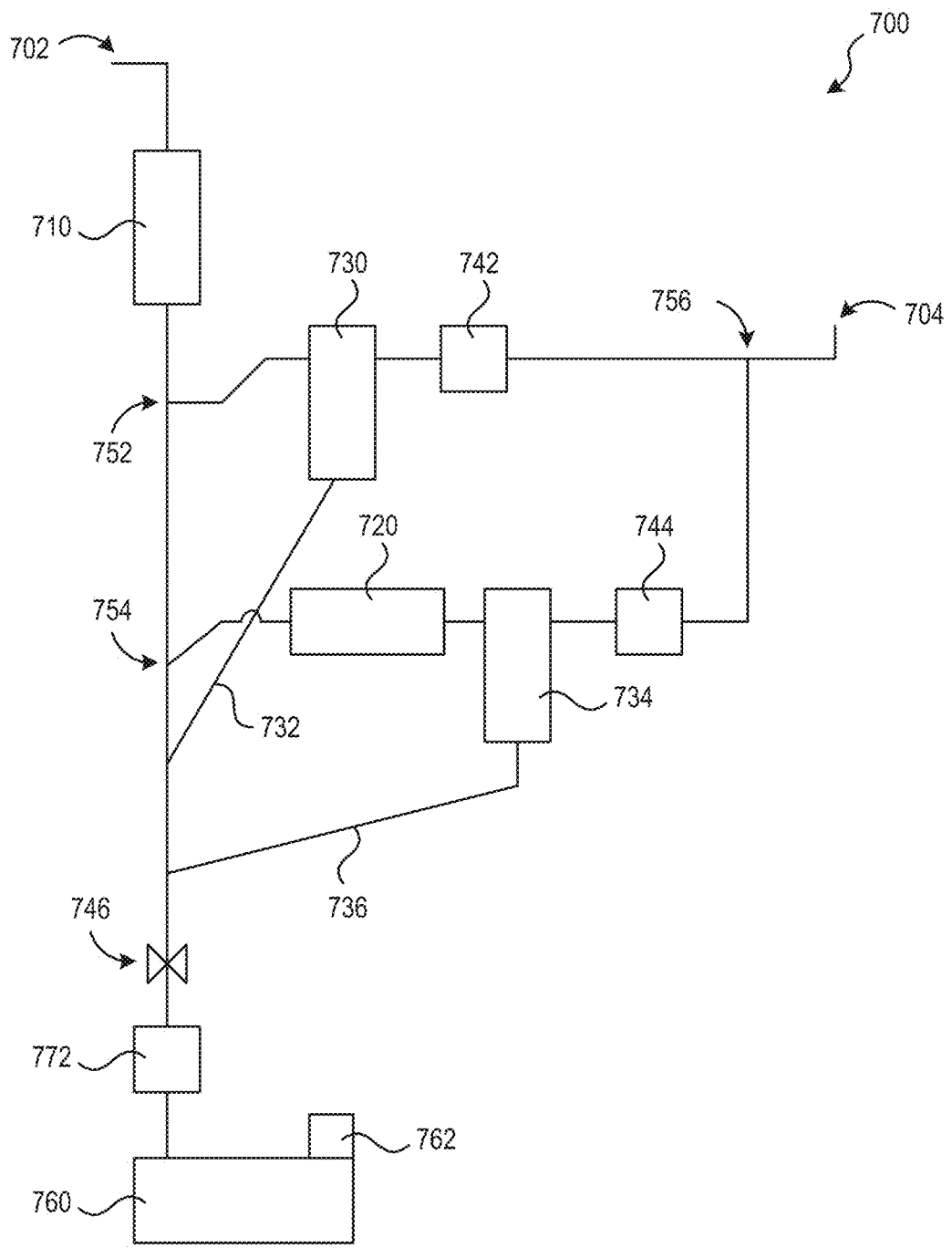
FIG. 7A is an isometric view of a system for removing organic compounds from a product stream configured in accordance with embodiments of the present technology.
Figure 8:
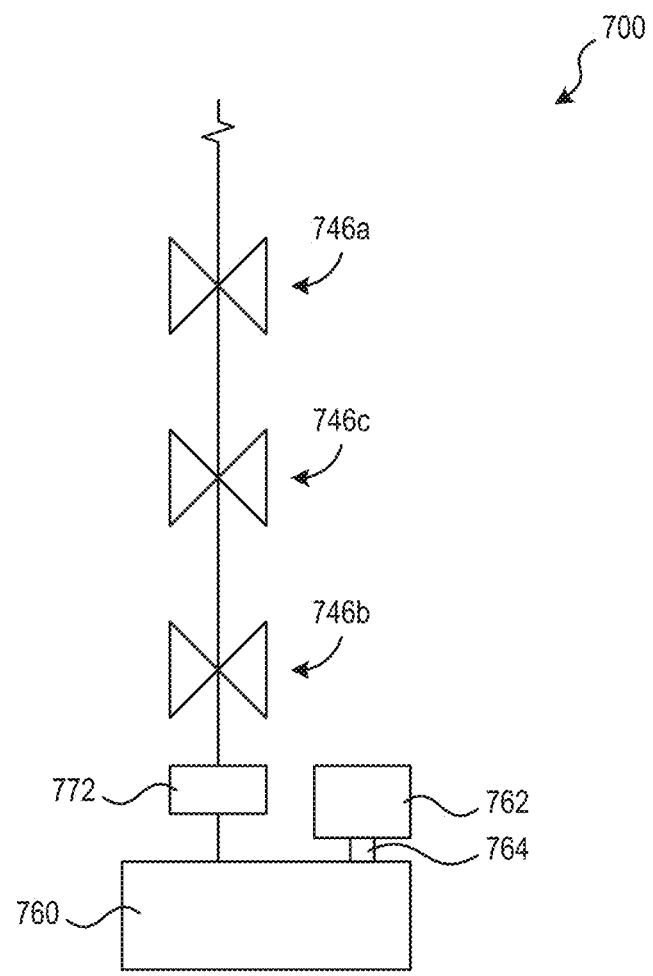
FIG. 8 is an isometric view of a storage component of the system of FIGS. 7A and 7B configured in accordance with embodiments of the present technology.

FIG. 7A is an isometric view of a system 700 for removing byproducts from a product stream, and FIG. 8 is an isometric view of a storage component of the system 700, configured in accordance with embodiments of the present technology. In the illustrated embodiment, the system 700 is generally similar to the system 300 discussed above with reference to FIG. 3. For example, the system 700 illustrated in FIG. 7A includes a first condenser 710 coupled to an input channel 702, a first coalescer 730 downstream from the first condenser 710 along a first flow path, a second condenser 720 downstream from the first condenser 710 along a second flow path, and a second coalescer 734 downstream from the second condenser 720. The system 700 also includes a first valve 742 downstream from the first coalescer 730 and a second valve 744 downstream from the second coalescer 734.

As discussed above, the first and second valves 742, 744 can open and close the first and second flow paths to configure the system 700 for normal operation and/or regeneration. For example, during normal operation, the first valve 742 is open while the second valve 744 is closed. As a result, the product stream flows along the first flow path through the first condenser 710, a first tee 752, the first coalescer 730, the first valve 742, a third tee 756, and into an output channel 704. In this configuration, the first condenser 710 and the first coalescer 730 can remove byproducts from the product stream (e.g., through condensation, absorption, and/or the like). During regeneration, the first valve 742 is closed while the second valve 744 is open. As a result, the product stream flows along the second flow path through the first condenser 710, the first tee 752, a second tee 754, the second condenser 720, the second coalescer 734, the second valve 744, the third tee 756, and into the output channel 704. In this configuration, the first condenser 710 and the first coalescer 730 can be heated (and/or not actively cooled) such that byproduct compounds therein melt and/or evaporate to drain out of the first condenser 710 and the first coalescer 730. In turn, the second condenser 720 and the second coalescer 734 can remove byproducts from the product stream (e.g., through condensation, absorption, and/or the like).

As illustrated in FIG. 7A, the first and second condensers 710, 720 are positioned above the reservoir 760 with a downhill drain path therebetween. For example, the first condenser 710 is directly above the reservoir 760 with the first tee 752, the second tee 754, and a third valve 746 forming a direct drain path to the reservoir. Accordingly, byproducts condensing therein drain toward the reservoir 760 without any active pumping from the system 700. Additionally, as further illustrated in FIG. 7A, the first coalescer 730 is coupled to a first coalescer drain 732 and the second coalescer 734 is coupled to a second coalescer drain 736. The first and second coalescer drains 732, 736 establish a downhill drain path between the first and second coalescers 730, 734, respectively, and the reservoir 760. As a result, byproduct compounds adsorbed (or otherwise captured) in the first and second coalescers 730, 734 can drain toward the reservoir 760 without any active pumping from the system 700.

In the illustrated embodiment, the first and second flow paths through the system 700 are at least partially defined by piping between and/or integrated with components of the system 700. The piping can include metal, PVC, and/or other suitable pipes. In a specific, non-limiting example, the piping can include 2-inch (2") pipes that help simplify the design, maintenance, and/or replacement of the piping. In various other embodiments, however, the flow paths can be defined by 1", 1.5", 3", 4", and/or any other suitable size of pipe based on a scale of the pyrolysis reactor, a desired operating pressure, a desired pressure drop, and/or the like.

As further illustrated in FIG. 7A, and illustrated in more detail in the partially schematic diagram of FIG. 8, the system 700 also includes features that allow the reservoir 760 to be periodically replaced, emptied, and/or cleaned. For example, the system 700 includes the third valve 746 positioned between the reservoir 760 and any of the drain paths discussed above, a sensor 762 positioned to measure a fluid level in the reservoir 760, and one or more purge lines 772.

As best illustrated in FIG. 8, the third valve 746 can be a double block and bleed valve arrangement that can be configured to prevent byproducts from draining into the reservoir 760 during a replacement and/or cleaning process, prevent the product stream from leaking past the third valve 746, and/or prevents air from leaking into the system 700 during a reservoir change while also allowing excess purge gas (or another suitable gas) to vent from the reservoir side as needed. In the illustrated embodiment, the third valve 746 has a double isolation and bleed configuration that includes first and second blocking valves 746a, 746b and a bleeding valve 746c. The first blocking valve 746a can be opened and closed to control the flow of byproduct toward the reservoir 760 while the second blocking valve 746b and the bleeding valve 746c can be opened and closed to control the venting of purge gases (and other suitable gases) away from the reservoir 760. For example, the first blocking valve 746a can be closed to start a replacement process. The purge lines 772 can then purge the remaining room in the reservoir 760 with an inert gas (e.g., Argon) that forces lighter gases (e.g., air, hydrogen gas, and the like) out of the reservoir 760. The removed gases then flow through the second blocking valve 746b and out of the system 700 through the bleeding valve 746c to another system where they can be captured, processed, and/or vented away. Once the purge is complete (e.g., after a predetermined period, when the inert gas is detected flowing through the bleeding valve 746c, and/or the like), the bleeding valve 746c and the second blocking valve 746b are closed. The reservoir 760 is then removed, cleaned (e.g., emptied by feeding the byproduct compounds into the pyrolysis reactor to decompose), and/or replaced. The bleeding valve 746c and the second blocking valve 746b are then opened and the purge lines 772 purge the new reservoir with an inert gas to remove air and/or other gasses that might react with the collected byproducts. Once a purge is complete, the bleeding valve 746c is closed and the first blocking valve 746a is open, thereby allowing byproduct compounds to drain into the reservoir 760.

In various other embodiments, the third valve 746 can have different configurations. For example, the third valve 746 can have a trunnion style ball valve that can be altered to control draining and venting through the third valve 746. In some embodiments, the third valve 746 is a single block and bleed valve (e.g., omitting the second blocking valve 746b). And in some embodiments, the third valve 746 is a single blocking valve and the system 700 includes a separate bleed valve coupled to the purge lines 772 and/or does not include a bleed valve.

FIG. 8 also illustrates additional details on the coupling between the sensor 762 and the reservoir 760 in accordance with some embodiments of the present technology. In the illustrated embodiment, further illustrated in FIG. 8, the sensor 762 can be couplable to the reservoir 760 through a flange 764. The flange 764 allows the sensor 762 to be decoupled from the reservoir 760 during a reservoir change and/or cleaning to allow the system to reuse the sensor 762. In various other embodiments, the sensor 762 can be couplable to various other portions of the reservoir 760 (e.g., a lower surface, a side surface, and/or the like), permanently integrated with the reservoir 760, and/or coupled to the reservoir 760 through various other mechanisms (e.g., a window in the upper surface of reservoir 760). Further, in some embodiments, the system 700 does not include the sensor 762 (or the flange 764 to accommodate the sensor 762). In such embodiments, the system 700 can include a window (or other volume indicator) on the side of the reservoir 760, allowing users to monitor the volume of byproducts collected and/or the remaining empty volume in the reservoir 760.

Returning to the discussion of FIG. 7A, similar to the discussion above, in some embodiments, the first and second tees 752, 754 are combined. For example, the first tee 752 can be combined with the second tee 754 in a cross-tee configuration (e.g., a four-way junction). In such embodiments, the first condenser 710 is coupled to a first junction of the cross, the first coalescer 730 is coupled to a second junction of the cross along the first flow path, the second condenser 720 is coupled to a third junction of the cross along the second flow path, and the reservoir 760 is coupled to a fourth junction of the cross to allow liquid byproducts to drain out of the first and second flow paths. Relatedly, in some embodiments, the first coalescer drain 732 and the second coalescer drain 736 can meet at a junction (e.g., another tee) before draining toward the reservoir 760.

Further, it will be understood that, in some embodiments, various components of the system 700 can be positioned in different orientations. For example, the second condenser 720 can be oriented vertically (or nearly vertically) to help liquid byproducts to drain toward the reservoir 760. In another example, the first and second valves 742, 744 can be positioned at various other angles (e.g., inverted to provide additional access to the valve mechanism). In another example, although a particular configuration of the purge lines 772 is illustrated in FIGS. 7A and 8, it will be understood that various other suitable configurations can be used to deliver a purge gas to the reservoir 760 and/or the system 700 and/or to transport other gasses (e.g., oxygen) away from a newly installed reservoir. In a specific, non-limiting example, the purge lines 772 can be coupled directly to the reservoir 760 and addressed during a reservoir change. Additionally, or alternatively, one or more of the components of the system 700 can have a different size. For example, the reservoir 760 can be larger to reduce the frequency changes of the reservoir 760 are necessary.

Figure 7B:
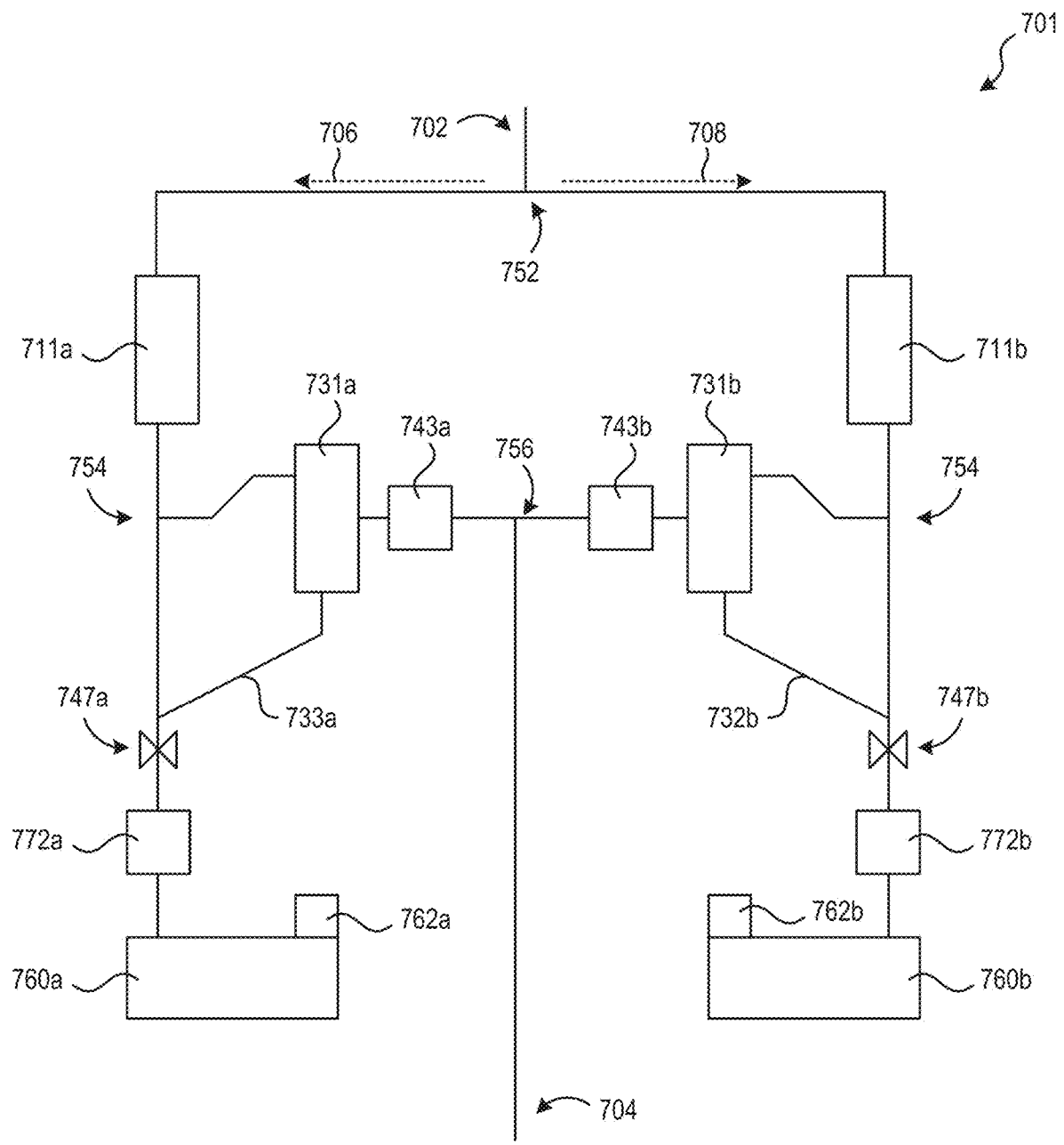
FIG. 7B is an isometric view of a system for removing organic compounds from a product stream configured in accordance with further embodiments of the present technology.

FIG. 7B is an isometric view of a system 701 for removing byproducts from a product stream configured in accordance with embodiments of the present technology. As illustrated in FIG. 7B, the system 701 is generally similar to the system 700 of FIG. 7A, modified to include multiple parallel paths in accordance with further embodiments of the present technology. For example, in the embodiment illustrated in FIG. 7B, the input channel 702 is coupled to a first tee 752 that divides an incoming product stream into a first flow path 706 (e.g., traveling left from the first tee 752) and a second flow path 708 (e.g., traveling right from the first tee 752). As a result, the first and second flow paths 706, 708 are generally in parallel with each other.

Further, the first and second flow paths 706, 708 can include generally similar components. For example, as illustrated in FIG. 7B, the first flow path 706 can include a first condenser 711a, a first coalescer 731a downstream from the first condenser 711a along the first flow path 706, and a first valve 743a downstream from the first coalescer 731a along the first flow path 706. Similarly, the second flow path 708 can include a second condenser 711b, a second coalescer 731b downstream from the second condenser 711b along the second flow path 708, and a second valve 743b downstream from the second coalescer 731b along the second flow path 708. The first and second condensers 711a, 711b can each be generally similar (or identical) to the first condenser 710 discussed above with reference to FIG. 7A. Similarly, the first and second coalescers 731a, 731b can each be generally similar (or identical) to the first coalescer 730 discussed above with reference to FIG. 7A.

As a result, when the first valve 743a is open, the product stream can flow in through the input channel 702, through the first condenser 711a, the first coalescer 731a, and the first valve 743a, then into a second tee 754 to flow toward an output channel. In this configuration, the first condenser 711a and the first coalescer 731a can remove byproducts from the product stream (e.g., through condensation, absorption, and/or the like). To regenerate the first flow path 706, the first valve 743a can be closed while the second valve 743b is opened. As a result, the product stream flows along the second flow path 708 through the second condenser 711b, the second coalescer 731b, the second valve 743b, and the second tee 754, and into the output channel 704. In this configuration, the first condenser 711a and the first coalescer 731a can be heated (and/or not actively cooled) such that byproduct compounds therein melt and/or evaporate to drain out of the first condenser 711a and the first coalescer 731a. Meanwhile, the second condenser 711b and the second coalescer 731b can remove byproducts from the product stream (e.g., through condensation, absorption, and/or the like). To regenerate the second flow path 708, the first valve 743a can be opened while the second valve 743b is closed, thereby inverting the flow of the product stream.

In some embodiments, the first and second flow paths are active and/or regenerating inverse exclusive to each other, such that the second flow path 708 is regenerating while the first flow path 706 is removing byproducts from the product stream and vice versa. The exclusive operation embodiments can help ensure that the second flow path 708 is always available (e.g., sufficiently regenerated) when the first flow path 706 needs to be regenerated, and vice versa. As a result, the exclusive operation embodiments can help reduce downtime in the overall pyrolysis system required to regenerate the system 701. In some embodiments, the first and second flow paths 706, 708 are operated in a non-exclusive manner such that both the first and second flow paths 706, 708 can be actively removing byproducts from the product stream at the same time. In such embodiments, the first and second flow paths 706, 708 can be managed (e.g., cyclically scheduled, monitored, and/or the like) to help reduce the chance that both the first and second flow paths 706, 708 need to be regenerated at the same time. The fully parallel operation of the first and second flow paths 706, 708 can allow the system 701 to process a larger volume of the product stream to support larger pyrolysis systems and/or more intensive pyrolysis operations.

As further illustrated in FIG. 7B, the first flow path 706 and the second flow path 708 are positioned above a first reservoir 760a and a second reservoir 760b, respectively, with a downhill drain path therebetween. For example, the first condenser 711a is directly above the first reservoir 761a with a second tee 754 and a first reservoir valve 747a forming a direct drain path to the first reservoir 760a. Accordingly, byproducts condensing therein drain toward the first reservoir 760a without any active pumping from the system 701. Additionally, as further illustrated in FIG. 7B, the first coalescer 731a is coupled to a first coalescer drain 733a. The first coalescer drain 733a can establish a downhill drain path between the first coalescer 731a and the first reservoir 760a. As a result, byproduct compounds adsorbed (or otherwise captured) in the first coalescer 731a can drain toward the first reservoir 760a without any active pumping from the system 701. Similarly, the second condenser 711b is directly above the second reservoir 761b and the second coalescer 731b is coupled to a second coalescer drain 733b that establishes a downhill drain path between the second coalescer 731b and the second reservoir 760b. Accordingly, byproducts condensing in the second condenser 711b and/or adsorbed (or otherwise captured) in the second coalescer 731b can drain toward the second reservoir 760b without any active pumping from the system 701.

As still further illustrated in FIG. 7B, the system 701 can also include features that allow the first and second reservoirs 760a, 760b to be periodically replaced, emptied, and/or cleaned. For example, the system 701 includes the first and second reservoir valves 747a, 747b positioned between the first and second reservoirs 760a, 7610b, respectively, and any of the drain paths discussed above. Additionally, or alternatively, the system can include a first and second sensors 762a, 762b positioned to measure a fluid level in the first and second reservoirs 760a, 7610b, respectively, and/or first and second purge lines 772a, 772b. Additional details on examples of suitable sensors and purge lines are discussed above with reference to FIGS. 7A and 8, which allow fluid levels in the first and second reservoirs 760a, 7610b to be monitored and/or allow the first and second reservoirs 760a, 7610b to be isolated from the system 701 to be emptied, swapped, and/or cleaned.

In some embodiments, the system 701 of FIG. 7B can be modified to include any suitable number of flow paths (e.g., one flow path, three flow paths, five flow paths, and/or any other suitable number). The additional flow paths can provide additional parallel channels to help expand the capacity of the system 701, reduce the chance that no flow paths are available to remove byproducts from the product stream, and/or the like. Additionally, or alternatively, it will be understood that the first flow path 706 and/or the second flow path 708 can be modified in view of any of discussion above. Purely by way of example, the first flow path 706 can include two sub-flow paths that are generally similar to the system 700 discussed above with respect to FIG. 7A, such that the second flow path 708 is in parallel with the system 700. In such embodiments, the second flow path 708 of FIG. 7B can provide a back-up flow path to the system 700 in case both of the sub-flow paths need to be regenerated at the same time. In another example, similar to the discussion of FIG. 4A, the system 701 of FIG. 7B can be modified such that the first and second flow paths 706, 708 each drain into the same reservoir.

Additionally, or alternatively, the first and second reservoirs 760a, 760b can be replaced by other various other suitable features. For example, as discussed above, the other features can be configured to: recirculate all (or a portion of) the byproducts back to the reactor, send all (or a portion) of the byproducts to a carbon collection system, and/or send all (or a portion) of the byproducts to the combustion feed (e.g., when the system 700 is running in a state that allows $CO_2$ generation).

Figure 9:
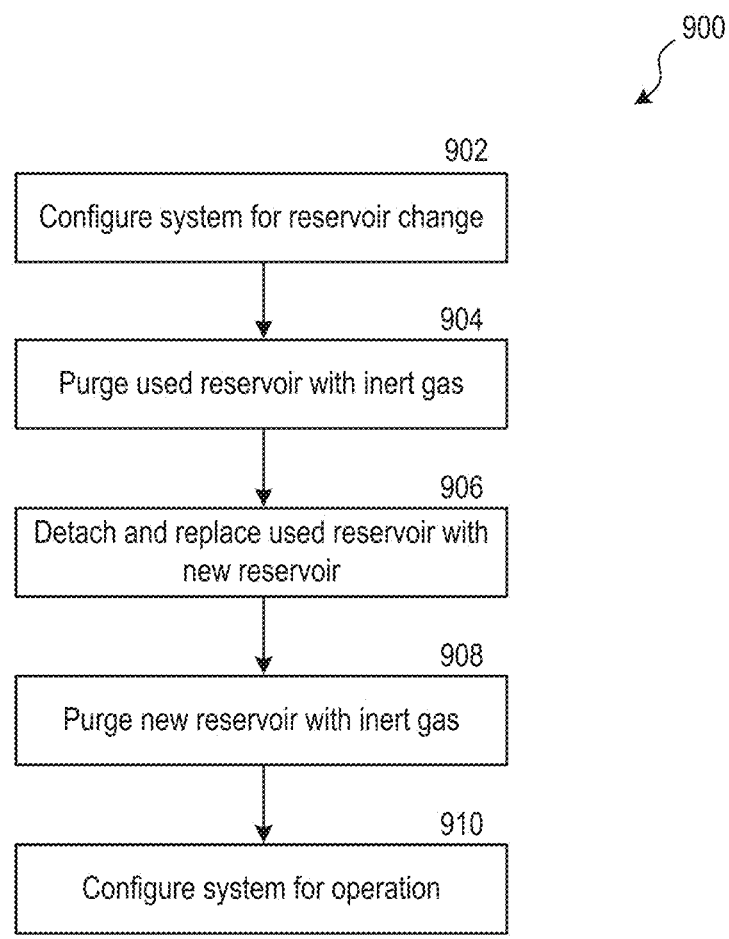
FIG. 9 is a flow diagram of a process for resetting a system for collecting organic compounds configured in accordance with embodiments of the present technology.

FIG. 9 is a flow diagram of a process 900 for resetting a system for collecting byproducts in accordance with further embodiments of the present technology. The process 900 can control various components of the pyrolysis system (e.g., various components of the pyrolysis system 100 of FIG. 1), such as the pyrolysis reactor and/or the byproduct separating system coupled to the pyrolysis reactor. Similar to the discussion above, the process 900 can be implemented by a controller in the pyrolysis system 100 discussed above with reference to FIG. 1, a controller in any of the systems 200, 300, 400 discussed above with reference to FIGS. 2A-4B, and/or any suitable controllers coupled thereto.

The process 900 begins at block 902 by configuring the system (e.g., the pyrolysis system and/or the byproduct separating system specifically) for a reservoir change. Configuring the system can include closing one or more valves (e.g., the first blocking valve 746a as discussed above with reference to FIG. 8) and/or ramping down the pyrolysis system to reduce the production of byproduct compounds while the reservoir is being changed. Ramping down the pyrolysis system can include reducing (or stopping) a flow of a reactant fuel supply to the pyrolysis reactor, reducing (or stopping) the flow of combustion fuel to the combustion component, and/or the like.

At block 904, the process 900 includes purging the used reservoir with an inert gas. As discussed above, the purging process can include opening one or more bleed valves and supplying a flow of the inert gas into the reservoir. Because the inert gas is relatively heavy (e.g., compared to ambient air, hydrogen gas, and the like), the inert gas pushes the compounds out of the reservoir and through the bleed valve and forms an inert layer over the liquid byproducts in the reservoir. For example, the inert layer can remove flammable hydrogen, unreacted pyrolysis fuel, and/or other vapor products from reservoir 760 and thereby help improve the safety of the reservoir 760 and/or reduce the number of (or prevent) reactions of the byproducts in the reservoir while being transported and/or stored that can produce heat and/or hazardous chemicals. Once the purge is complete, the process 900 can close any necessary valves (e.g., the second blocking valve 746b of FIG. 8, the bleeding valve 746c, and/or any other suitable valves) to prepare to detach the reservoir.

At block 906, the process 900 includes detaching and replacing the used reservoir with a new reservoir (or detaching, emptying, and reattaching the reservoir). In some embodiments, the used reservoir is coupled to an input supply for the pyrolysis reactor to feed the byproducts into the pyrolysis reactor to decompose. Purely by way of example, hydrocarbon byproducts (e.g., PAHs) can be fed into the pyrolysis reactor to decompose into hydrogen gas and various other substances. In other embodiments, the reservoir is transferred to another processing system to safely decompose, deconstruct (e.g., through another chemical reaction), and/or dispose of the captured compounds.

At block 908, the process 900 includes purging the new (or emptied) reservoir with inert gas. The purge process can include opening one or more valves (e.g., the second blocking valve 746b of FIG. 8, the bleeding valve 746c, and/or any other suitable valves) and supplying the inert gas to the reservoir (e.g., through the purge lines 772 of FIG. 8). By purging the new reservoir, the process 900 can remove oxygen and/or other components of ambient air that might otherwise react with gas in the product stream after the new reservoir is attached to the system and/or the byproducts as they drain into the reservoir. As a result, the process 900 can reduce the chance that heat and/or hazardous chemicals are produced as byproduct compounds drain into the reservoir.

At block 910, the process 900 configures the system for operation. Block 910 can be initiated after the reservoir is adequately purged (e.g., a predetermined period of time, after a known volume of inert gas is directed into the reservoir, after inert gas is detected at the bleeding valve, and/or the like) to reduce the chance of deleterious chemical reactions. Configuring the system for operation can include closing one or more valves (e.g., the bleeding valve 746c of FIG. 8), opening one or more valves (e.g., the first blocking valve 746a), and/or ramping the pyrolysis reactor back up.

Figure 10B:
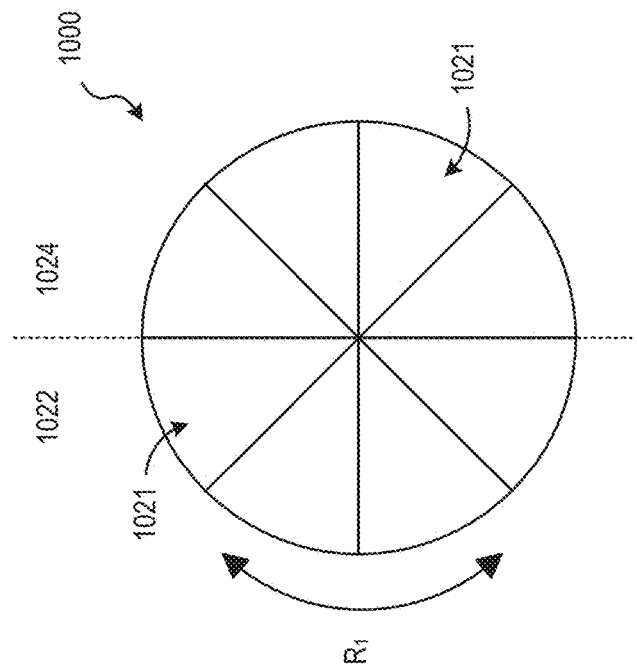
FIGS. 10A and 10B are schematic side and top views, respectively, of a rotatable condenser for a system for removing organic compounds from a product stream configured in accordance with embodiments of the present technology.
Figure 10A:
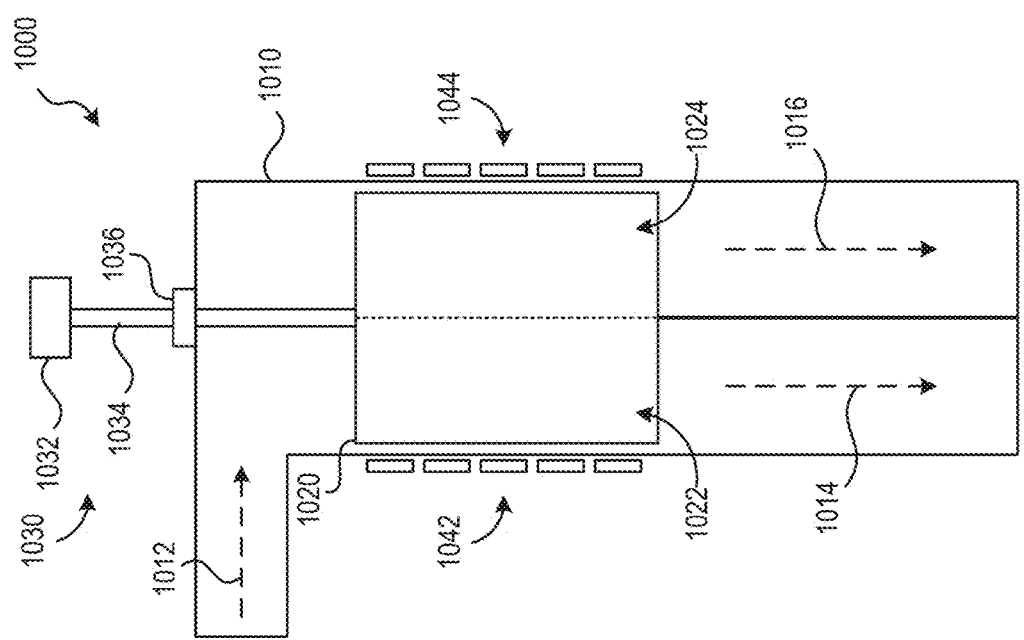

FIGS. 10A and 10B are schematic side and top views, respectively, of a rotatable condenser 1020 for a system 1000 for removing organic compounds from a product stream configured in accordance with embodiments of the present technology. As illustrated in FIG. 10A, the system 1000 can include a flow chamber 1010 (e.g., one or more pipes) that define an input flow path 1012. Similar to the discussion above, the input flow path 1012 can be coupled to a product stream from a pyrolysis reactor. Further, the input flow path 1012 is coupled to the rotatable condenser 1020. The rotatable condenser 1020 can be generally similar to the first condenser 210 discussed above with reference to FIG. 2. In the illustrated embodiments, however, the rotatable condenser 1020 is coupled to a rotation subsystem 1030.

The rotation subsystem 1030 includes an actuator 1032 (e.g., a motor), a drive shaft 1034 coupled between the actuator 1032 and the rotatable condenser 1020, and a sealing component 1036 coupled between the drive shaft 1034 and the flow chamber 1010. The sealing component 1036 can allow the drive shaft 1034 to actuate without releasing the product stream external to the flow chamber. As a result, the sealing component 1036 can allow the actuator 1032 to be positioned outside of (and thermally insulated from) the flow chamber 1010. The actuator 1032 and the drive shaft 1034, in turn, can drive rotation about a longitudinal axis of the rotatable condenser 1020. For example, as best illustrated in FIG. 10B, the actuator 1032 and the drive shaft 1034 (FIG. 10A) can drive the rotatable condenser 1020 along a rotational path $R_1$.

As further illustrated in FIG. 10B, the rotatable condenser 1020 can include a plurality of sections 1021. As the rotatable condenser 1020 moves along the rotational path $R_1$, the sections 1021 can move between a condensing zone 1022 (e.g., an actively cooled zone) and a regeneration zone 1024 (e.g., a heated and/or non-actively cooled zone). Referring to FIGS. 10A and 10B collectively, the input flow path 1012 can be fluidly coupled to only the sections 1021 that are in the condensing zone 1022. The product stream can then enter the condensing zone 1022 and cool such that the byproducts condense (or freeze) while the hydrogen gas (and/or other gasses) are emitted into a first output channel 1014. That is, as the product stream flows through the condensing zone 1022, a portion (or all) of the byproducts in the product stream are condensed (or frozen) and captured within the rotatable condenser 1020. The first output channel 1014 can be coupled to another condenser (e.g., another rotatable condenser and/or a condenser of any of the types discussed above), one or more coalescers for further processing, and/or another suitable system (e.g., a hydrogen processing system).

In contrast, the sections 1021 of the rotatable condenser 1020 in the regeneration zone 1024 are heated (or not actively cooled) such that the byproducts melt and/or evaporate. The byproducts can then be directed into a second output channel 1016. Similar to the first output channel 1014, second output channel 1016 can be coupled to another condenser (e.g., another rotatable condenser and/or a condenser of any of the types discussed above), one or more coalescers, and/or the like to allow any hydrogen remaining in the sections 1021 in the regeneration zone 1024 to be captured and separated from the byproducts. Additionally, or alternatively, the second output channel 1016 can be coupled to a reservoir and/or another suitable endpoint (e.g., a system to direct the byproducts back to the pyrolysis reactor).

In the illustrated embodiments, the system 1000 can include one or more active cooling components 1042 thermally coupled to the flow chamber 1010 and/or the rotatable condenser 1020 around the condensing zone 1022. Additionally, or alternatively, the system 1000 can include one or more active heating components 1044 thermally coupled to the flow chamber 1010 and/or the rotatable condenser 1020 around the regeneration zone 1024.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A system for removing byproducts from a pyrolysis reactor product stream, the system comprising:
   a first condenser fluidly couplable to the product stream and positioned to capture at least a portion of the byproducts from the product stream;
   a coalescer positioned to receive an output of the first condenser;
   a first valve positioned to regulate a flow of the product stream along a first flow path including the first condenser and the coalescer;
   a second condenser fluidly couplable to the product stream, wherein the second condenser is and in parallel with or downstream from the first condenser; and
   a second valve positioned to regulate a flow of the product stream along a second flow path different than the first flow path.
2. The system of clause 1 wherein the first valve and the second valve are part of a set of valves configurable between (i) a first state to at least partially block the product stream from flowing through the second flow path and (ii) a second state allowing the product stream to flow through the second flow path.
3. The system of clause 2 wherein:
   in the first state, the first valve is open and the second valve is closed, and
   in the second state, the first valve is closed and the second valve is open.
4. The system of any of clauses 1-3 wherein the coalescer is a first coalescer, and wherein the system further comprises a second coalescer fluidly couplable to the product stream downstream from the second condenser along the second flow path.
5. The system of clause 4 wherein:
   the first valve is positioned downstream from the first coalescer;
   the second valve is positioned downstream from the second coalescer; and
   the first valve and the second valve are part of a set of valves configurable between a first state and a second state, wherein:
      in the first state, the first valve is open and the second valve is closed to at least partially block the product stream from flowing through the second coalescer, and
      in the second state, the first valve is closed and the second valve is open to at least partially block the product stream from flowing through the first coalescer.

6. The system of any of clauses 1-3 wherein the coalescer is fluidly couplable to the product stream downstream from the second condenser along the second flow path.

7. The system of clause 6 wherein:
the first valve is positioned between the first condenser and the coalescer;
the second valve is positioned between the second condenser and the coalescer; and
the first valve and the second valve are part of a set of valves configurable between a first state and a second state, wherein:
in the first state, the first valve is open and the second valve is closed to prevent the product stream from flowing through the second condenser before reaching the coalescer, and
in the second state, the first valve is closed and the second valve is open to prevent the product stream from passing through the coalescer without flowing through the second condenser.

8. The system of any of clauses 1-3 wherein the coalescer is a first coalescer, wherein the system further comprises a second coalescer fluidly couplable to the product stream downstream from the second condenser along the second flow path, and wherein:
the first valve is positioned upstream from the first condenser;
the second valve is positioned upstream from the second condenser; and
the first valve and the second valve are part of a set of valves configurable between a first state and a second state, wherein:
in the first state, the first valve is open and the second valve is closed to at least partially block the product stream from flowing through the second flow path, and
in the second state, the first valve is closed and the second valve is open to at least partially block the product stream from flowing through the first flow path.

9. The system of any of clauses 1-8, further comprising a reservoir fluidly couplable to the first flow path and the second flow path to receive at least a portion of the byproducts captured in the first flow path and the second flow path.

10. The system of any of clauses 1-9, further comprising:
a first cooling component thermally couplable to the first condenser and positioned to cool the first condenser;
a heating component thermally couplable to the first condenser and positioned to heat the first condenser; and
a second cooling component thermally couplable to the second condenser and positioned to cool the second condenser.

11. The system of any of clauses 1-10, wherein the product stream is at a first temperature, and wherein:
the first condenser is configured to operate at a second temperature lower than the first temperature to remove one or more first byproduct compounds with a first boiling point and/or melting point; and
the second condenser or the coalescer is configured to operate at a third temperature lower than the second temperature to remove one or more second byproduct compounds with a second boiling point and/or melting point lower than the first boiling point or first melting point.

12. The system of clause 11, wherein:
the second temperature is no greater than 5° C., 10° C., 30° C., 50° C., 80° C., 100° C., 120° C., 150° C., 200° C., 250° C., 350° C., or 500° C.; and
the third temperature is no greater than 5° C., 10° C., 30° C., 50° C., 80° C., 100° C., 120° C., 150° C., 200° C., 250° C., or 350° C.

13. The system of any of clauses 1-12 wherein the byproducts include one or more organic compounds.

14. The system of any of 13 wherein the organic compounds include polycyclic aromatic hydrocarbon (PAH).

15. A method for operating a system for removing byproducts from a product stream from a pyrolysis reactor, the method comprising:
configuring a set of one or more valves in a first state such that the product stream flows through a first condenser;
detecting a regeneration condition; and
after detecting the regeneration condition, configuring the set of one or more valves from the first state to a second state such that the product stream flows through a second condenser.

16. The method of clause 15, further comprising cooling the first condenser to cool the product stream as it flows through the first condenser.

17. The method of any of clauses 15 and 16, further comprising heating the first condenser toward a regeneration temperature, wherein the heating causes solid byproducts in the first condenser to melt and/or causes liquid byproduct in the first condenser to evaporate.

18. The method of clause 17 wherein the regeneration temperature is between 80 degrees Celsius and 200 degrees Celsius.

19. The method of any of clauses 17 and 18, further comprising cooling the first condenser from the regeneration temperature toward a condensing temperature.

20. The method of any of clauses 15-19, further comprising:
detecting a completion condition; and
after detecting the completion condition, configuring the set of one or more valves from the second state back to the first state such that the product stream flows through the first condenser into the coalescer and is at least partially impeded from flowing through the second condenser.

21. The method of clause 20, further comprising, after the completion condition, heating the second condenser toward a regeneration temperature, wherein the heating causes solid byproducts in the second condenser to melt and/or causes liquid byproduct in the second condenser to evaporate.

22. The method of any of clauses 20 and 21 wherein detecting the completion condition includes detecting a pressure upstream from the first condenser below a predetermined baseline pressure threshold.

23. The method of any of clauses 15-22 wherein:
the set of one or more valves includes at least a first valve downstream from a first coalescer and a second valve downstream from a second coalescer, wherein the first coalescer is fluidly coupled to the first condenser, and wherein the second coalescer is fluidly coupled to the second condenser;
configuring the set of one or more valves into the second state includes closing the first valve to at least partially block the output from the first condenser from flowing through the first coalescer and opening the second valve to allow the output from the first condenser to flow through the second coalescer; and configuring the set of one or more valves into the first state includes opening the first valve to allow the output from the first condenser to flow through the first coalescer and closing the second valve to at least partially block the output from the first condenser from flowing through the second coalescer.

24. The method of any of clauses 15-23 wherein:

the set of one or more valves includes at least (1) a first valve coupled between the first condenser and the coalescer and (2) a second valve coupled between the second condenser and the coalescer;

configuring the set of one or more valves into the second state includes closing the first valve and opening the second valve to at least partially block the output from the first condenser from flowing through the coalescer without flowing through the second condenser; and configuring the set of one or more valves into the first state includes opening the first valve and closing the second valve to at least partially block the output from the first condenser from flowing through the second condenser.

25. The method of any of clauses 15-24 wherein detecting the regeneration condition includes detecting at least one of a predetermined maximum time between regenerations, a pressure upstream from the first condenser above a predetermined maximum pressure threshold, and/or a rate of increase in the pressure upstream from the first condenser above a predetermined rate.

26. The method of any of clauses 15-25, further comprising:

detecting an emergency condition; and after detecting the emergency condition:
  decreasing a flow of reactant to the pyrolysis reactor; and/or
  starting a flow of a purge gas through the pyrolysis reactor and the first condenser.

27. A system for producing hydrogen from a hydrocarbon reactant, the system comprising:

a pyrolysis reactor fluidly couplable to a hydrocarbon reactant supply, wherein the pyrolysis reactor includes at least one reaction chamber positioned to (i) receive the hydrocarbon reactant and (ii) heat the hydrocarbon reactant above a reaction temperature to generate a product stream that includes hydrogen gas and a byproduct gas; and a product-scrubbing system fluidly coupled to the pyrolysis reactor and positioned to remove at least a portion of the byproduct gas from the product stream, the product-scrubbing system comprising:
  a first condenser fluidly coupled to the product stream and positioned to condense at least a portion of the byproduct gas;
  a coalescer fluidly coupled to the first condenser, wherein the coalescer is positioned to absorb at least a portion of byproduct gas remaining in the product stream;
  a first valve positioned to regulate a flow of the product stream along a first flow path including the first condenser and the coalescer;
  a second condenser fluidly coupled to first condenser and positioned to condense at least a portion of the byproduct gas; and
  a second valve positioned to regulate a flow of the product stream along a second flow path.

28. The system of clause 27 wherein:

the coalescer is a first coalescer, the first valve is downstream from the first coalescer, the product-scrubbing system further comprises a second coalescer fluidly coupled to the second condenser downstream from the second condenser, and the second valve is downstream from the second coalescer.

29 The system of any of clauses 27 and 28 wherein the product-scrubbing system is fluidly coupled to the pyrolysis reactor to direct at least a portion of the condensed byproduct gas to the pyrolysis reactor.

30. The system of any of clauses 27-29 wherein the byproduct gas includes aromatic hydrocarbons.

31. A system for removing organic compounds (byproducts) from a pyrolysis reactor product stream, the system comprising:

a first condenser fluidly couplable to the product stream and positioned along a first flow path to capture at least a first portion of the byproducts from the product stream;

a second condenser fluidly couplable to the product stream and positioned along a second flow path to capture at least a second portion of the byproducts from the product stream; and a flow control device positioned to regulate a flow of the product stream along the first flow path and/or the second flow path.

32. The system of clause 31 wherein the first flow path and the second flow path are in parallel.

33. The system of clause 32 wherein the flow control device comprises a three-way valve positioned upstream from the first condenser and the second condenser, and wherein:

in a first position, the three-way valve directs the flow of the product stream along the first flow path, and in a second position, the three-way valve directs the flow of the product stream along the second flow path.

34. The system of clause 32 wherein the flow control device comprises a set of one or more valves movable between a first position and a second position, and wherein:

in a first position, the set of one or more valves directs the flow of the product stream along the first flow path, and in a second position, the set of one or more valves directs the flow of the product stream along the second flow path.

35. The system of clause 31 wherein the second flow path is at least partially downstream from the first flow path.

36. The system of clause 35 wherein the second flow path is coupled to the first flow path downstream from the first condenser at a connection point, wherein the flow control device comprises a three-way valve at the connection point, and wherein:

in a first position, the three-way valve directs the flow of the product stream along the first flow path beyond the connection point, and in a second position, the three-way valve directs the flow of the product stream along the second flow path beyond the connection point.

37. The system of clause 35 wherein the flow control device comprises a set of one or more valves movable between a first position and a second position, and wherein:

in a first position, the set of one or more valves directs the flow of the product stream along the first flow path beyond the connection point, and in a second position, the set of one or more valves directs the flow of the product stream along the second flow path beyond the connection point.

38. The system of any of clauses 31-37, further comprising a coalescer positioned downstream from the first condenser along the first flow path.
39. The system of any of clauses 31-38, further comprising a coalescer positioned downstream from the second condenser along the second flow path.
40. The system of any of clauses 31-39, further comprising an absorber bed positioned downstream from the first condenser along the first flow path.
41. The system of any of clauses 31-40, further comprising an absorber bed positioned downstream from the second condenser along the second flow path.
42. The system of any of clauses 31-41, further comprising an absorber bed positioned downstream from the first and second flow paths to remove at least a portion of organic compounds from the product stream.
43. The system of any of clauses 31-42 wherein the byproducts include one or more organic compounds.
44. The system of any of 43 wherein the organic compounds include polycyclic aromatic hydrocarbon (PAH).
45. A method for operating a system for removing byproducts from a product stream from a pyrolysis reactor, the method comprising:
configuring a flow control device in a first state such that the product stream flows through a first condenser;
detecting a regeneration condition; and
after detecting the regeneration condition, configuring the flow control device from the first state to a second state such that the product stream flows through a second condenser.
46. The method of clause 45, further comprising cooling the first condenser to cool the product stream as it flows through the first condenser.
47. The method of any of clauses 45 and 46, further comprising heating the first condenser toward a regeneration temperature, wherein the heating causes solid byproducts in the first condenser to melt and/or causes liquid byproducts in the first condenser to evaporate.
48. The method of clause 47 wherein the regeneration temperature is between 80 degrees Celsius and 200 degrees Celsius.
49. The method of any of clauses 45-48, further comprising cooling the first condenser from the regeneration temperature toward a condensing temperature.
50. The method of any of clauses 45-49, wherein a compositional or other analyzer measures byproduct composition, melting point, boiling point, or heat capacity and adjusts the temperature of each of the first and second condenser and coalescer stages to optimally remove or collect byproducts.
51. The method of any of clauses 45-50, further comprising:
detecting a completion condition; and
after detecting the completion condition, configuring the flow control device from the second state back to the first state such that the product stream flows through the first condenser into the coalescer and is at least partially impeded from flowing through the second condenser.
52. The method of clause 51, further comprising, after the completion condition, heating the second condenser toward a regeneration temperature, wherein the heating causes solid byproducts in the second condenser to melt and/or causes liquid byproduct in the second condenser to evaporate.
53. The method of any of clauses 51 and 52 wherein detecting the completion condition includes detecting a pressure upstream from the first condenser below a predetermined baseline pressure threshold.
54. The method of any of clauses 45-53 wherein detecting the regeneration condition includes detecting at least one of a predetermined maximum time between regenerations, a pressure upstream from the first condenser above a predetermined maximum pressure threshold, and/or a rate of increase in the pressure upstream from the first condenser above a predetermined rate.
55. The method of any of clauses 45-54, further comprising:
detecting an emergency condition; and
after detecting the emergency condition:
decreasing a flow of reactant to the pyrolysis reactor; and/or
starting a flow of a purge gas through the pyrolysis reactor and the first condenser.
56. A system for removing byproducts in a product stream from a pyrolysis reactor, the system comprising:
a first condenser fluidly couplable to the product stream to capture at least a first portion of the byproducts from the product stream;
a coalescer fluidly coupled to the first condenser and positioned to receive an output from the first condenser;
a first valve positioned to regulate a flow of the product stream along a first flow path including the first condenser and the coalescer;
a second condenser fluidly couplable to the product stream to capture at least a second portion of the byproducts from the product stream; and
a second valve positioned to regulate a flow of the product stream along a second flow path different than the first flow path, wherein the second flow path includes the second condenser.
57. The system of example 56, wherein the second condenser is downstream from the first condenser.
58. The system of example 57, further comprising a tee downstream from the first condenser and the second condenser, wherein the tee is fluidly coupled between the first condenser and the coalescer and positioned between the second condenser and the coalescer.
59. The system of example 57, wherein the coalescer is a first coalescer, further comprising a second coalescer fluidly coupled to the second condenser to receive an output from the second condenser.
60. The system of example 56, wherein the second flow path is in parallel with the first flow path, wherein the coalescer is a first coalescer, wherein the system further comprises a second coalescer in the second flow path, and wherein the second coalescer is fluidly coupled to the second condenser to receive an output from the second condenser.
61. The system of any of examples 56-60, wherein the first valve and the second valve are part of a set of valves configurable between (i) a first state to at least partially block the product stream from flowing through the second flow path and (ii) a second state allowing the product stream to flow through the second flow path.
62. The system of any of examples 56-60, wherein the coalescer is a first coalescer, wherein the system further comprises a second coalescer fluidly couplable to the product stream downstream from the second condenser along the second flow path, and wherein:
the first valve is positioned downstream from the first coalescer;
the second valve is positioned downstream from the second coalescer; and the first valve and the second valve are part of a set of valves configurable between a first state and a second state, wherein:
  in the first state, the first valve is open and the second valve is closed to at least partially inhibit the product stream from flowing through the second coalescer, and
  in the second state, the first valve is closed and the second valve is open to at least partially inhibit the product stream from flowing through the first coalescer.

63. The system of any of examples 56-60, wherein the coalescer is a first coalescer, wherein the system further comprises a second coalescer fluidly couplable to the product stream downstream from the second condenser along the second flow path, and wherein:
the first valve is positioned upstream from the first condenser;
the second valve is positioned upstream from the second condenser; and
the first valve and the second valve are part of a set of valves configurable between a first state and a second state, wherein:
  in the first state, the first valve is open and the second valve is closed to at least partially block the product stream from flowing through the second flow path, and
  in the second state, the first valve is closed and the second valve is open to at least partially block the product stream from flowing through the first flow path.

64. The system of any of examples 56-63, further comprising a reservoir fluidly couplable to the first flow path to receive at least a portion of the byproducts captured in the first flow path.

65. A method for operating a system for removing byproducts from a pyrolysis reaction in a product stream from a pyrolysis reactor, the method comprising:
configuring a set of valves in a first state such that the product stream flows along a first flow path through the system;
detecting a regeneration condition; and
after detecting the regeneration condition, configuring the set of valves from the first state to a second state such that the product stream flows along a second flow path through the system different from the first flow path.

66. The method of example 65, wherein the first flow path includes a condenser, and wherein the method further comprises heating the condenser toward a regeneration temperature after configuring the set of valves from the first state to the second state, wherein the heating causes solid byproducts in the condenser to melt and/or causes liquid byproduct in the condenser to evaporate.

67. The method of any of examples 65 and 66, further comprising:
detecting a completion condition; and
after detecting the completion condition, configuring the set of valves from the second state back to the first state such that the product stream flows along the first flow path and is at least partially impeded from flowing along the second flow path.

68. The method of example 67, wherein the first flow path includes a condenser, and wherein the method further comprises cooling the condenser from a regeneration temperature toward a condensing temperature after detecting the completion condition.

69. The method of any of examples 67 and 68, wherein the second flow path includes a condenser, and wherein the method further comprises, after configuring the set of valves from the second state back to the first state, heating the condenser toward a regeneration temperature, wherein the heating causes solid byproducts in the condenser to melt and/or causes liquid byproduct in the condenser to evaporate.

70. The method of any of examples 67-69, wherein the first flow path includes a condenser, and wherein detecting the completion condition includes detecting a pressure upstream from the condenser below a predetermined baseline pressure threshold.

71. The method of any of examples 65-70, wherein:
the first flow path includes a first condenser and a first coalescer downstream from and fluidly coupled to the first condenser;
the second flow path includes a second condenser and a second coalescer downstream from and fluidly coupled to the second condenser;
the set of valves includes at least a first valve downstream from the first coalescer and a second valve downstream from the second coalescer;
configuring the set of valves into the second state includes closing the first valve to at least partially block a first output from the first condenser from flowing through the first coalescer and opening the second valve to allow a second output from the second condenser to flow through the second coalescer; and
configuring the set of valves into the first state includes opening the first valve to allow the first output from the first condenser to flow through the first coalescer and closing the second valve to at least partially block the second output from the second condenser from flowing through the second coalescer.

72. The method of any of examples 65-71, wherein detecting the regeneration condition includes detecting predetermined maximum time between regenerations, a pressure upstream from a condenser in the first flow path above a predetermined maximum pressure threshold, and/or a rate of increase in the pressure upstream from the condenser in the first flow path above a predetermined rate.

73. The method of any of examples 65-72, further comprising:
detecting an emergency condition; and
after detecting the emergency condition:
  decreasing a flow of reactant to the pyrolysis reactor; and/or
  starting a flow of a purge gas through the pyrolysis reactor and a condenser in the first flow path.

74. A system for removing organic compounds in a product stream from a pyrolysis reactor, the system comprising:
a first condenser fluidly couplable to the product stream and positioned along a first flow path to capture at least a first portion of the organic compounds from the product stream;
a second condenser fluidly couplable to the product stream and positioned along a second flow path to capture at least a second portion of the organic compounds from the product stream; and
a flow control device positioned to regulate a flow of the product stream along the first flow path and/or the second flow path.

75. The system of example 74 wherein the first flow path and the second flow path are in parallel.

76. The system of example 74 wherein the second flow path is at least partially downstream from the first flow path.
77. The system of example 76 wherein the flow control device comprises a three-way valve positioned upstream from the first condenser and the second condenser, and wherein:
in a first position, the three-way valve directs the flow of the product stream along the first flow path, and
in a second position, the three-way valve directs the flow of the product stream along the second flow path.
78. The system of any of examples 74-77 wherein the flow control device comprises a set of valves movable between a first position and a second position, and wherein:
in a first position, the set of valves directs the flow of the product stream along the first flow path, and
in a second position, the set of valves directs the flow of the product stream along the second flow path.
79. The system of example 76 wherein the second flow path is coupled to the first flow path downstream from the first condenser at a connection point, wherein the flow control device comprises a three-way valve at the connection point, and wherein:
in a first position, the three-way valve directs the flow of the product stream along the first flow path beyond the connection point, and
in a second position, the three-way valve directs the flow of the product stream along the second flow path beyond the connection point.
80. The system of any of examples 74-79, further comprising a coalescer positioned downstream from the first condenser along the first flow path.

Conclusion

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Further, the terms "approximately," "about," and "generally" are used herein to mean within at least within 10% of a given value or limit. Purely by way of example, an approximate ratio means within 10% percent of the given ratio.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

From the foregoing, it will also be appreciated that various modifications may be made without deviating from the disclosure or the technology. For example, although specific examples of a pyrolysis reactor have been described herein, one of skill in the art will understand that the byproduct scrubbing systems described herein can be used in conjunction with a variety of other pyrolysis reactors and/or in conjunction with a variety of other sources of byproducts of similar composition, or alternatively, one of ordinary skill in the art will understand that various components of the technology can be further divided into subcomponents, that various components and functions of the technology may be combined and integrated, and/or that various components can be reordered. In a specific, non-limiting example, the second condenser described above with reference to FIGS. 2A and 2B can be arranged downstream from the coalescer. In another specific, non-limiting example, the second condenser described above with reference to FIGS. 2A and 2B can be in a second flow path that is parallel to the first flow path (e.g., with the second condenser parallel to the first condenser rather than downstream from the first condenser). In addition, certain aspects of the technology described in the context of particular embodiments may also be combined or eliminated in other embodiments.

Furthermore, although advantages associated with certain embodiments of the technology have been described in the context of those embodiments, other embodiments may also exhibit such advantages, and not all embodiments need necessarily exhibit such advantages to fall within the scope of the technology. For example, although a variety of alternatives were discussed above with reference to the byproducts-scrubbing system of FIGS. 2A and 2B, it will be understood that the modifications and/or alternatives also apply to the byproduct scrubbing systems described with reference to FIGS. 3, 4A, 4B, 7A, and 7B. In a specific, non-limiting example, it will be understood that any of the byproduct scrubbing systems described with reference to FIGS. 3, 4A, 4B, 7A, and 7B can include one, three, four, five, and/or any other suitable number of flow paths (e.g., a third flow path as a back-up to the second flow path in case both the first and second regenerations need to occur at the same time). Accordingly, the disclosure and associated technology can encompass other embodiments not expressly shown or described herein.

We claim:
1. A system for removing byproducts in a product stream from a pyrolysis reactor, the system comprising:
a first condenser fluidly couplable to the product stream to capture at least a first portion of the byproducts from the product stream;
a coalescer fluidly coupled to the first condenser and positioned to receive an output from the first condenser;

a first valve positioned to regulate a flow of the product stream along a first flow path including the first condenser and the coalescer;

a second condenser fluidly couplable to the product stream to capture at least a second portion of the byproducts from the product stream; and a second valve positioned to regulate a flow of the product stream along a second flow path different than the first flow path, wherein the second flow path includes the second condenser.

2. The system of claim 1, wherein the second condenser is downstream from the first condenser.

3. The system of claim 2, further comprising a tee downstream from the first condenser and the second condenser, wherein the tee is fluidly coupled between the first condenser and the coalescer and positioned between the second condenser and the coalescer.

4. The system of claim 2, wherein the coalescer is a first coalescer, further comprising a second coalescer fluidly coupled to the second condenser to receive an output from the second condenser.

5. The system of claim 1, wherein the second flow path is in parallel with the first flow path, wherein the coalescer is a first coalescer, wherein the system further comprises a second coalescer in the second flow path, and wherein the second coalescer is fluidly coupled to the second condenser to receive an output from the second condenser.

6. The system of claim 1, wherein the first valve and the second valve are part of a set of valves configurable between (i) a first state to at least partially block the product stream from flowing through the second flow path and (ii) a second state allowing the product stream to flow through the second flow path.

7. The system of claim 1, wherein the coalescer is a first coalescer, wherein the system further comprises a second coalescer fluidly couplable to the product stream downstream from the second condenser along the second flow path, and wherein:

the first valve is positioned downstream from the first coalescer;

the second valve is positioned downstream from the second coalescer; and the first valve and the second valve are part of a set of valves configurable between a first state and a second state, wherein:

in the first state, the first valve is open and the second valve is closed to at least partially inhibit the product stream from flowing through the second coalescer, and in the second state, the first valve is closed and the second valve is open to at least partially inhibit the product stream from flowing through the first coalescer.

8. The system of claim 1, wherein the coalescer is a first coalescer, wherein the system further comprises a second coalescer fluidly couplable to the product stream downstream from the second condenser along the second flow path, and wherein:

the first valve is positioned upstream from the first condenser;

the second valve is positioned upstream from the second condenser; and the first valve and the second valve are part of a set of valves configurable between a first state and a second state, wherein:

in the first state, the first valve is open and the second valve is closed to at least partially block the product stream from flowing through the second flow path, and in the second state, the first valve is closed and the second valve is open to at least partially block the product stream from flowing through the first flow path.

9. The system of claim 1, further comprising a reservoir fluidly couplable to the first flow path to receive at least a portion of the byproducts captured in the first flow path.

10. A method for operating a system for removing byproducts from a pyrolysis reaction in a product stream from a pyrolysis reactor, the method comprising:

configuring a set of valves in a first state such that the product stream flows along a first flow path through the system, wherein the first flow path comprises a first condenser fluidly couplable to the product stream to capture at least a first portion of the byproducts from the product stream and a coalescer fluidly coupled to the first condenser and positioned to receive an output from the first condenser;

detecting a regeneration condition; and after detecting the regeneration condition, configuring the set of valves from the first state to a second state such that the product stream flows along a second flow path through the system different from the first flow path, wherein the second flow path comprises a second condenser fluidly couplable to the product stream to capture at least a second portion of the byproducts from the product stream.

11. The method of claim 10, wherein the method further comprises heating the first condenser toward a regeneration temperature after configuring the set of valves from the first state to the second state, wherein the heating causes solid byproducts in the first condenser to melt and/or causes liquid byproducts in the first condenser to evaporate.

12. The method of claim 10, further comprising:

detecting a completion condition; and after detecting the completion condition, configuring the set of valves from the second state back to the first state such that the product stream flows along the first flow path and is at least partially impeded from flowing along the second flow path.

13. The method of claim 12, wherein the method further comprises cooling the first condenser from a regeneration temperature toward a condensing temperature after detecting the completion condition.

14. The method of claim 12, wherein the method further comprises, after configuring the set of valves from the second state back to the first state, heating the second condenser toward a regeneration temperature, wherein the heating causes solid byproducts in the second condenser to melt and/or causes liquid byproduct in the second condenser to evaporate.

15. The method of claim 12, wherein detecting the completion condition includes detecting a pressure upstream from the first condenser below a predetermined baseline pressure threshold.

16. The method of claim 10, wherein:

the coalescer comprises a first coalescer;

the second flow path includes a second condenser and a second coalescer downstream from and fluidly coupled to the second condenser;

the set of valves includes at least a first valve downstream from the first coalescer and a second valve downstream from the second coalescer;

configuring the set of valves into the second state includes closing the first valve to at least partially block a first output from the first condenser from flowing through the first coalescer and opening the second valve to allow a second output from the second condenser to flow through the second coalescer; and configuring the set of valves into the first state includes opening the first valve to allow the first output from the first condenser to flow through the first coalescer and closing the second valve to at least partially block the second output from the second condenser from flowing through the second coalescer.

17. The method of claim 10, wherein detecting the regeneration condition includes detecting predetermined maximum time between regenerations, a pressure upstream from the first condenser in the first flow path above a predetermined maximum pressure threshold, and/or a rate of increase in the pressure upstream from the first condenser in the first flow path above a predetermined rate.

18. The method of claim 10, further comprising:
detecting an emergency condition; and
after detecting the emergency condition:
    decreasing a flow of reactant to the pyrolysis reactor; and/or
    starting a flow of a purge gas through the pyrolysis reactor and the first condenser in the first flow path.

19. A system for removing organic compounds in a product stream from a pyrolysis reactor, the system comprising:
a first condenser fluidly couplable to the product stream and positioned along a first flow path to capture at least a first portion of the organic compounds from the product stream;
a coalescer fluidly couplable to the first condenser and positioned to receive an output from the first condenser;
a second condenser fluidly couplable to the product stream and positioned along a second flow path to capture at least a second portion of the organic compounds from the product stream; and
a flow control device positioned to regulate a flow of the product stream along the first flow path and/or the second flow path.

20. The system of claim 19 wherein the flow control device comprises a set of valves movable between a first position and a second position, and wherein:
in a first position, the set of valves directs the flow of the product stream along the first flow path, and
in a second position, the set of valves directs the flow of the product stream along the second flow path.

\* \* \* \* \*